United States Patent
Sivarajan et al.

(10) Patent No.: US 10,023,755 B2
(45) Date of Patent: *Jul. 17, 2018

(54) SOLVENT-BASED AND WATER-BASED CARBON NANOTUBE INKS WITH REMOVABLE ADDITIVES

(71) Applicant: NANO-C, INC., Westwood, MA (US)

(72) Inventors: Ramesh Sivarajan, Shrewsbury, MA (US); Henning Richter, Newton, MA (US); Viktor Vejins, Concord, MA (US)

(73) Assignee: NANO-C, INC., Westwood, MA (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/082,253

(22) Filed: Mar. 28, 2016

(65) Prior Publication Data

US 2016/0257833 A1    Sep. 8, 2016

Related U.S. Application Data

(63) Continuation of application No. 13/725,080, filed on Dec. 21, 2012, now Pat. No. 9,340,697, which is a
(Continued)

(51) Int. Cl.
*H01B 1/04* (2006.01)
*C09D 11/52* (2014.01)
(Continued)

(52) U.S. Cl.
CPC ............. *C09D 11/52* (2013.01); *B05D 3/007* (2013.01); *C09D 11/033* (2013.01); *C09D 11/037* (2013.01)

(58) Field of Classification Search
CPC ..... C09D 11/52; C09D 11/033; C09D 11/037; C09D 11/101; C09D 133/14; H01B 1/128; H01B 1/04; H01B 1/22; H01B 1/24
(Continued)

(56) References Cited

U.S. PATENT DOCUMENTS 5,156,669 A    10/1992    Zierke et al.
5,273,729 A    12/1993    Howard et al.
(Continued)

FOREIGN PATENT DOCUMENTS

CN    1727414 A    2/2006
CN    102648249 A    8/2012
(Continued)

OTHER PUBLICATIONS

Ainsworth et al., "Isomeric and Nuclear-Substituted Beta-Aminoethyl-1,2,4-Triazoles", J. Am. Chem. Soc, vol. 77, No. 3, pp. 621-624 (1995).
Chiang et al., "Purification and Characterization of Single-Wall Carbon Nanotubes," J. Phys_Chem. B, 105, 1157-1161 (2001 ).
Colomer et al., "Different purification methods of carbon nanotubes produced by catalytic synthesis," Synthetic Metals, 103, 2482-2483 (1999).
European Search Report dated Jul. 4, 2014 in European Patent Application No. 10808792.5.
Harutyunyan et al., "Purification of Single-Wall Carbon Nanotubes by Selective Microwave Heating of Catalyst Particles," J. Phys Chem B, 106, 8671-8675 (2002).
(Continued)

*Primary Examiner* — Tri V Nguyen
(74) *Attorney, Agent, or Firm* — The Marbury Law Group, PLLC

(57) ABSTRACT

In accordance with some embodiments, compositions and methods for forming solvent-based and water-based carbon nanotubes inks with removable additives are provided. In some embodiments, an ink composition is provided that includes a plurality of carbon nanotubes, a solvent, and a triazole-based removable additive, where the plurality of carbon nanotubes are dispersed within the solvent and wherein the triazole-based removable additive stabilizes the plurality of carbon nanotubes that are dispersed in the solvent.

18 Claims, 14 Drawing Sheets

Related U.S. Application Data continuation-in-part of application No. 12/855,640, filed on Aug. 12, 2010, now Pat. No. 9,296,912.

(60) Provisional application No. 61/234,203, filed on Aug. 14, 2009.

(51) Int. Cl.
| | |
|---|---|
| *B82Y 30/00* | (2011.01) |
| *B82Y 40/00* | (2011.01) |
| *C09D 11/033* | (2014.01) |
| *C09D 11/037* | (2014.01) |
| *B05D 3/00* | (2006.01) |

(58) Field of Classification Search
USPC .................. 252/500, 510, 502; 106/287.2
See application file for complete search history.

(56) References Cited

U.S. PATENT DOCUMENTS

| | | | |
|---|---|---|---|
| 5,459,016 A | 10/1995 | Debe et al. | |
| 5,985,232 A | 11/1999 | Howard et al. | |
| 6,331,262 B1 | 12/2001 | Haddon et al. | |
| 6,523,950 B1 * | 2/2003 | Lawrence | B41M 5/52 |
| | | | 347/105 |
| 7,335,344 B2 | 2/2008 | Height et al. | |
| 7,396,520 B2 | 7/2008 | Howard et al. | |
| 7,435,403 B2 | 10/2008 | Kronholm et al. | |
| 7,494,608 B2 | 2/2009 | Li et al. | |
| 7,758,891 B2 | 7/2010 | Desai et al. | |
| 8,255,299 B2 | 8/2012 | Cambridge | |
| 8,765,024 B2 | 7/2014 | Richter et al. | |
| 2003/0101901 A1 | 6/2003 | Bergemann et al. | |
| 2004/0240754 A1 | 12/2004 | Lionel et al. | |
| 2005/0167640 A1 | 8/2005 | Matsushima et al. | |
| 2005/0250244 A1 | 11/2005 | Li et al. | |
| 2006/0025497 A1 | 2/2006 | Ushirogouchi et al. | |
| 2006/0062983 A1 | 3/2006 | Irvin et al. | |
| 2006/0102966 A1 | 5/2006 | Leenders et al. | |
| 2006/0124028 A1 | 6/2006 | Huang et al. | |
| 2006/0154416 A1 | 7/2006 | Seitz et al. | |
| 2006/0196375 A1 * | 9/2006 | Coe-Sullivan | B41M 5/0256 |
| | | | 101/327 |
| 2006/0246438 A1 | 11/2006 | McCall et al. | |
| 2007/0057255 A1 | 3/2007 | Murray et al. | |
| 2007/0065977 A1 | 3/2007 | Rinzler et al. | |
| 2007/0078215 A1 | 4/2007 | Yoon et al. | |
| 2007/0270520 A1 * | 11/2007 | Akiyama | C09D 11/101 |
| | | | 522/1 |
| 2007/0292622 A1 | 12/2007 | Rowley et al. | |
| 2008/0132597 A1 | 6/2008 | Nozawa et al. | |
| 2008/0290787 A1 | 11/2008 | Cok | |
| 2008/0308772 A1 | 12/2008 | Akasaka et al. | |
| 2008/0311424 A1 | 12/2008 | Choi et al. | |
| 2009/0032777 A1 | 2/2009 | Kitano et al. | |
| 2009/0191355 A1 | 7/2009 | Lee et al. | |
| 2009/0266580 A1 | 10/2009 | Jung et al. | |
| 2009/0269568 A1 | 10/2009 | Kuhlmann et al. | |
| 2009/0288764 A1 | 11/2009 | Arrington | |
| 2010/0247381 A1 | 9/2010 | Yodh et al. | |
| 2011/0003071 A1 | 1/2011 | Uensal et al. | |
| 2011/0048277 A1 | 3/2011 | Sivarajan et al. | |
| 2011/0053050 A1 | 3/2011 | Lim et al. | |
| 2011/0104376 A1 | 5/2011 | Bielek et al. | |
| 2011/0251331 A1 | 10/2011 | McAndrew et al. | |
| 2011/0194044 A1 | 12/2011 | Artero et al. | |
| 2012/0097902 A1 | 4/2012 | Arifuku et al. | |
| 2012/0183770 A1 | 7/2012 | Bosnyak et al. | |
| 2013/0076834 A1 * | 3/2013 | Nosaka | B41J 2/161 |
| | | | 347/50 |
| 2013/0116502 A1 | 5/2013 | Cambridge | |

FOREIGN PATENT DOCUMENTS

| | | |
|---|---|---|
| EP | 1764340 | 3/2007 |
| EP | 1834922 | 9/2007 |
| TW | 200710029 | 3/2007 |
| WO | WO 2007/029588 | 3/2007 |
| WO | WO 2008/001998 | 1/2008 |
| WO | WO 2009/130528 | 10/2009 |
| WO | WO 2010/059008 | 5/2010 |
| WO | WO 2010/125966 | 11/2010 |
| WO | WO 2011/019970 | 2/2011 |
| WO | WO 2014/076273 | 5/2014 |

OTHER PUBLICATIONS

International Patent Application No. PCT/US201 0/045391, filed Aug. 12, 2010.
International Preliminary Report on Patentability in International Patent Application No. PCT/US201 0/045391, filed Aug. 12, 2010, dated Feb. 23, 2012.
International Search Report and the Written Opinion of the International Searching Authority, International Patent Application No. PCT/US2010/045391, dated Oct. 14, 2010.
International Search Report and the Written Opinion of the International Searching Authority, International Patent Application No. PCT/US2013/077145, dated Apr. 18, 2014.
Milnera, M., et al., "Periodic Resonance Excitation and Intertube Interaction from Quasicontinuous Distributed Helicities in Single-Wall Carbon Nanotubes" In Physical Review Letter, vol. 84, Feb. 7, 2000, pp. 1324-1327.
Office Action dated Apr. 16, 2014 in Chinese Patent Application No. 201080043732.9.
Office Action dated Jun. 17, 2014 in Japanese Patent Application No. 100147485.
Office Action dated Nov. 15, 2014 in Chinese Application No. 201080043732.9.
Office Action dated Jul. 17, 2013 in Chinese Patent Application No. 201080043732.9.
Rinzler et al., "Large-scale purification of single-walled carbon nanotubes: process, product, and characterization," Appl. Phys. A 67, 29-37 (1998).
Sivarajan et al., "Identification of Large Fullerenes Formed during the Growth of Single-Walled Carbon Nanotubes in the HiPco Process," J. Phys Chem B, 107, 1360-1365 (2003).
Tasis et al., "Chemistry of Carbon Nanotubes," Chem_ Rev., 106, 1105-1136 (2006).
Wang et al., "A Highly Selective, One-Pot Purification Method for Single-Walled Carbon Nanotubes," J. Phys_ Chem_ B, 111,1249-1252 (2007).
Wiltshire et al., Comparative studies on acid and thermal based selective purification of HIPCO produced single-walled carbon nanotubes, Chemical Physics Letters, 386, 239-243 (2004).
Zhang et al., "Modular Functionalization of Carbon Nanotubes and Fullerenes," J. Am_ Chem_ Soc., 131, 8446-8454 (2009).

\* cited by examiner

SOLVENT-BASED AND WATER-BASED CARBON NANOTUBE INKS WITH REMOVABLE ADDITIVES

CROSS REFERENCE TO RELATED APPLICATIONS

This application is a continuation-in-part of U.S. patent application Ser. No. 12/855,640, filed Aug. 12, 2010, which claims the benefit of U.S. Provisional Patent Application No. 61/234,203, filed Aug. 14, 2009, which are hereby incorporated by reference herein in their entireties.

TECHNICAL FIELD

The disclosed subject matter relates to the formation of dispersions or inks of carbon nanotubes. More particularly, the disclosed subject matter relates to the formation of surfactant-free carbon nanotube inks in water and solvent media obtained with the use of removable additives.

BACKGROUND

Most applications of single-walled carbon nanotubes (SWCNT), double-walled carbon nanotubes (DWCNT), and multi-walled carbon nanotubes (MWCNT) often require that they are available in the form of dispersions in a purified form in a suitable solvent system. These types of carbon nanotubes are generically described as carbon nanotubes (CNT) unless otherwise indicated.

As produced raw carbon nanotube soots generally include material impurities (extraneous impurities), such as transition metal catalysts, graphitic carbons, amorphous carbon nanoparticles, fullerenes, carbon onions, and polycyclic aromatic hydrocarbons along with the desired carbon nanotube products. The nature and degree of the electronic impurities in a given raw material can depend on the method of synthesis, such as, for example, laser, arc, High-Pressure Carbon Monoxide Conversion (HiPco), chemical vapor deposition (CVD), or combustion.

Known purification protocols generally involve steps of generic unit operations like pre-oxidation, acid reflux, mechanical mixing, ultrasonication, filtration, neutralization, and centrifugation. Selecting a suitable combination depends upon the method of production of the carbon nanotubes and the specific impurity targeted. As shown below, Table 1 provides an exemplary list of the dominant impurities in different nanotube samples and unit operations employed in their purification.

TABLE 1

| SI No | Tube Type | Catalyst metal impurities | Dominant carbon impurities | Unit Operations Employed | Year | Reference |
|---|---|---|---|---|---|---|
| 1 | Laser | Co, Ni | Graphitic | $HNO_3$ reflux, neutralization, centrifugation, cross flow filtration | 1998 | Rinzler et al., Appl. Phys. A 67, 29-37 (1998) |
| 2 | Laser | Co, Ni | Graphitic | gas oxidation, HCl washing | 2001 | Chiang et al., J. Phys. Chem. B 105, 8297 (2001) |
| 3 | Arc | Ni, Y | Graphitic | microwave exposure, HCl washing | 2002 | Harutyunyan et al., J. Phys. Chem. B 106, 8671 (2002) |
| 4 | CVD | Co, Fe, Ni supported on zeolites | Amorphous | air oxidation, HF washing | 1999 | Colomer et al., Synthetic Metals 103, 2482 (1999) |
| 5 | HiPCO | Fe | Fullerenes, Amorphous | wet air oxidation, HCl washing and fluorinated extraction of fullerenic impurities | 2002 | Sivarajan et al., J. Phys. Chem. B 107, 1361 (2003) |
| 6 | HiPCO | Fe | Fullerenes, Amorphous | $H_2SO_4 + HNO_3$ sonication | 2004 | Wiltshire et al., Chemical Physics Letters 386, 239 (2004) |
| 7 | HiPCO | Fe | Fullerenes, Amorphous | one pot $HCl + H_2O_2$ washing | 2007 | Wang et al., J. Phys. Chem. B 111, 1249-1252 (2007) |

A. G. Rinzler et al., "Large-scale purification of single-walled carbon nanotubes: process, product, and characterization," Appl. Phys. A 67, 29-37 (1998) describes a large-scale purification approach for purifying carbon nanotubes employing a sequence of steps including, for example, nitric acid reflux, neutralization, centrifugation, and cross-flow filtration as essential steps to purify single-walled carbon nanotubes.

Extraneous impurities, such as catalyst metal particles, fullerenic carbon, amorphous carbon, graphitic carbon, and carbon onions, are present to different degrees in as prepared raw carbon nanotube samples. Oxidative chemical treatments as part of the purification protocol and multiple acid treatments as part of the typical purification processes result in reasonably clean carbon nanotubes (<0.5 wt % impurities). However, since the intrinsic electrical conductivity arises from the delocalized $\pi$ electrons of the SWCNT for a SWCNT of a given length and diameter, an aggressive chemical purification or side-wall derivatization during the purification process drains the $\pi$ electrons of the individual SWCNT. Such a loss of conductive electrons leads to a drastic fall in the single tube electrical conductance as well as the elimination of the inter-band optical transitions arising from the van Hove singularities. Accordingly, for many applications, especially applications requiring a combination of optical and electrical properties retaining the electronic structure of the CNT substantially intact is an important aspect in the formation of SWCNT inks.

There are numerous approaches that form stable dispersions of carbon nanotubes in water with the use of anionic, cationic, or non-ionic surfactants. These surfactants form a monolayer coating on the surface of the CNT in the dispersed form either as individuals or as thin bundles. There are also widely reported approaches that use ionic or neutral polymer molecules for solubilizing carbon nanotubes in a water medium. Known examples are, among others, polystyrene sulfonate, polyvinyl pyrrolidinone, polyethylene oxide (PEO), polypropylene oxide (PPO), and tri-block copolymers of PEO-PPO-PEO. However, when thin films of CNT networks are formed on solid substrates from such dispersions, most of the surfactants or the polymers remain as part of the carbon nanotube films/network as a coating on the carbon nanotubes and remain there even after treatments at elevated temperatures. Presence of such surface impurities affect the electronic properties of the carbon nanotube network—e.g., reducing the electrical conductivity of the network.

Another approach for forming carbon nanotube dispersions or inks in organic solvents is to chemically derivatize them. For example, Haddon et al., U.S. Pat. No. 6,331,262, describes an approach that involves end functionalization employing carboxylation followed by acid-chloride formation followed by the formation of amide linkage by reacting with a long chain amine. However, the resulting solutions in organic solvents did not show the characteristic absorption features in the UV-Visible range, thereby suggesting that the delocalized it electrons have been drained completely or significantly. In addition, it should be noted that the electrical properties of the functionalized carbon nanotubes were not reported.

Huang et al., U.S. Patent Publication No. 2006/0124028 A1, describes carbon nanotube ink compositions in an aqueous medium designed for inkjet printing, which were obtained by a chemical reaction involving an azo compound and carboxylated single-walled carbon nanotubes. This approach focuses on the ink-jet printability of the dispersion or ink rather than the intrinsic properties of the CNT altered by the azo-functionalization.

Carbon nanotube inks prepared, despite these prior art approaches, especially for SWCNT suffer from one or more of the following limitations:

a) Loss of inter-band optical transitions indicating a significant modification of the electronic structure of the single-walled carbon nanotubes or electronic defects; and/or b) Surfactant or polymeric dispersal aid residues that are not removable from the solid film when such inks are used to form carbon nanotube networks or films.

There is a need in the art for approaches that provide the formation of stable carbon nanotube inks in water or organic solvent media in which (a) the SWCNT have not lost their inter-band optical transitions signifying an intact electronic structure and (b) the dispersal aids that are used to stabilize the SWCNT do not leave non-volatile residue in the solid products such as films formed from such inks. Accordingly, it is desirable to provide solvent-based and water-based carbon nanotube inks that overcome these and other deficiencies of the prior art.

For example, in some embodiments, a dispersal aid system that is non-ionic, molecular in nature, conserves the electronic structure of the SWCNT as evidenced by the inter-band optical transitions and that uses dispersal aids that can be completely removed from the carbon nanotube network or films that are formed using the CNT ink.

SUMMARY

Applications of single-walled carbon nanotubes (SW-CNT), double-walled carbon nanotubes (DWCNT), and multi-walled carbon nanotubes (MWCNT) generally require carbon nanotubes in the form of dispersions in suitable solvent systems. Raw carbon nanotube soots generally include material impurities such as transition metal catalysts, graphitic carbons, amorphous carbon nanoparticles, fullerenes, carbon onions, polycyclic aromatics along with the desired carbon nanotube products.

The nature and degree of the impurities in a given raw material depends on the method of synthesis, such as, for example, laser, arc, High-Pressure Carbon Monoxide Conversion (HiPco), chemical vapor deposition (CVD), or combustion methods. Currently available purification processes and systems generally involve generic unit operations, such as pre-oxidation, acid reflux, mechanical mixing, ultrasonication, filtration, neutralization, and centrifugation.

For example, single-walled carbon nanotubes (SWCNT) can be produced using a premixed combustion of carbon-containing fuels, such as hydrocarbons, including methane, natural gas, or alcohols, while a metal catalyst precursor (such as iron pentacarbonyl, ferrocene, or a metal salt solution) is added continuously to the fresh gas mixture. Characteristics of the SWCNT formed, such as length, can be controlled by process parameters (e.g., pressure, inert gas dilution, temperature, fresh gas velocity, residence time, etc.). By-products are reaction products of the catalyst precursor, for example, iron or iron oxides (particularly $Fe_2O_3$) and carbonaceous material other than SWCNT, such as polycyclic aromatic hydrocarbons (PAH).

It should be noted that, although the present invention is generally described in connection with the purification and dispersion of flame synthesized carbon nanotubes, this is merely illustrative. The disclosed subject matter can provide, among other possible advantages and beneficial features, methods, techniques, apparatuses, systems, and/or methods of manufacture that can be used for the purification and formation of water-based or solvent-based suspensions of carbon nanotubes of all types.

In some embodiments, small molecular additives, such as diethylenetriamine (DETA) and diisopropylethylamine (DIPEA or Hunig's base), can be used as stabilizing additives that disperse single-walled carbon nanotubes without the elimination of the inter-band optical transitions or viscosity adjustment agents.

It should be noted that Hunig's base (DIPEA) is not soluble in water. In some embodiments, the present invention describes a method for making a water-based dispersion of single-walled carbon nanotubes employing amines that are not necessarily soluble in water.

In some embodiments, the present invention describes the formation of solvent-based CNT inks. For example, solvent-based CNT inks can be formed using N-methylpyrrolidinone (NMP) as the solvent and polypropylene carbonate oligomer as an additive that can be completely removed. It should be noted that the additive can act a stabilizing agent, a viscosity adjustment agent, or any suitable combination thereof.

Alternatively, in some embodiments, small molecular additives, such as a triazole-based compound, can be used as stabilizing additives that disperse single-walled carbon nanotubes without the elimination of the inter-band optical transitions or viscosity adjustment agents. In a more particular embodiment, the triazole-based compound is 1,2,4-Triazole.

It should be noted that, in some embodiments, the triazole-based additive can be unsubstituted 1,2,4-Triazole. For example, as shown in the chemical formula below, each of $R_1$, $R_2$, and $R_3$ can be hydrogen.

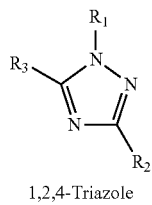

1,2,4-Triazole

Alternatively, the triazole-based additive can be substituted 1,2,4-Triazole. Substituted 1,2,4-Triazole can be used as an additive in water-based solvents and also in non-aqueous solvents based on the selected substituents. That is, $R_1$, $R_2$, and $R_3$ can be selected in order to achieve solubility in targeted solvents. For example, two or three substituting groups can be identical. In another example, one or two groups can be hydrogen. In yet another example, $R_1$, $R_2$, and $R_3$ (sometimes referred to herein as "R") can be straight-chain or branched or cyclic alkyl chains ($C_1$ to $C_{20}$) which can be unsubstituted, monosubstituted, or polysubstituted. Substituents can be selected from at least one of the following: OH, OR, $CO_2R$, OOCR, $SO_3H$, X (where X is F, Cl, Br, $NO_2$ and/or CN), $SO_2X$, COX, $NH_2$, $NR_2$, $NR_3^+$, substituted or unsubstituted benzyl ($CH_2C_6H_5$), substituted or unsubstituted phenyl, thiophene-radicals, $H_2PO_4$, and mixtures thereof. It should be noted that, in some embodiments, one or more $CH_2$ groups (including the one adjacent to triazole and establishing the link) can be replaced by one of the following units: O, CO, NH, $NHR^+$, $SO_2$, a cyclic alkyl, a substituted or unsubstituted aromatic ring containing only carbon or carbon and heteroatoms, the latter including nitrogen, sulfur, or oxygen.

As used herein, an "optionally substituted" group generally refers to functional groups that can be monosubstituted, polysubstituted, or unsubstituted by additional functional groups. When a group is unsubstituted by an additional group, it can be referred to as a group name, for example, alkyl. When a group is substituted with additional functional groups, it can be more generally referred to as substituted alkyl. As also used herein, "alkyl" generally refers to straight chain or branched or cyclic alkyl groups having from 1 to 20 carbon atoms ($C_1$ to $C_{20}$) (or from 1 to 15 carbon atoms, etc.).

In some embodiments, the additives described herein (e.g., stabilizing agents, dispersal aids, or viscosity adjustment agents) can also be used for the dispersion of other carbonaceous nanostructures, such as, for example, graphene, fullerenes like $C_{60}$ and $C_{70}$, shortened nanotubes (e.g., fullerene pipes), and nanofibers of any of these compounds in water and/or organic solvent media. In addition, these additives can be used for chemical derivatives of all carbonaceous nanostructures including, for example, single-walled carbon nanotubes, double-walled carbon nanotubes, multi-walled carbon nanotubes, graphene, fullerenes, shorted carbon nanotubes, and nanofibers.

In accordance with some embodiments of the present invention, an ink composition is provided, the ink composition comprising: a plurality of carbon nanotubes; a solvent; and a triazole-based removable additive that stabilizes the plurality of carbon nanotubes in the solvent.

In some embodiments, the plurality of carbon nanotubes are single-walled carbon nanotubes.

In some embodiments, the plurality of carbon nanotubes are a mixture of metallic and semiconducting single-walled carbon nanotubes.

In some embodiments, the plurality of carbon nanotubes are enriched in metallic single-walled carbon nanotubes.

In some embodiments, the plurality of carbon nanotubes are metallic single-walled carbon nanotubes.

In some embodiments, the plurality of carbon nanotubes are enriched in semiconducting single-walled carbon nanotubes.

In some embodiments, the plurality of carbon nanotubes are single-walled carbon nanotubes with a specific chirality.

In some embodiments, the solvent is one of: water, N-methylpyrrolidinone (NMP), propylene glycol monomethyl ether acetate (PGMEA), methyl ethyl ketone (MEK), and methyl isopropyl ketone.

In some embodiments, the triazole-based removable additive is selected to act as a dispersal agent and a stabilization agent.

In some embodiments, the removable additive is selected to adjust viscosity of the ink based at least in part on molecular weight of the removable additive.

In some embodiments, the triazole-based removable additive is a 1,2,4-triazole compound having a chemical formula:

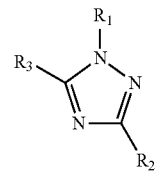

In some embodiments, each of $R_1$, $R_2$, and $R_3$ is hydrogen. In some embodiments, at least one of $R_1$, $R_2$, and $R_3$ is hydrogen. In some embodiments, at least one of $R_1$, $R_2$, and $R_3$ is an $C_1$-$C_{20}$ alkyl group.

In some embodiments, the $C_1$-$C_{20}$ alkyl group is optionally substituted with at least one substituent selected from one of: OH, OR, $CO_2R$, OOCR, $SO_3H$, X, $SO_2X$, COX, $NH_2$, $NR_2$, $NR_3^+$, optionally substituted benzyl, optionally substituted phenyl, thiophene radicals, $H_2PO_4$, and mixtures thereof, wherein R is the $C_1$-$C_{20}$ alkyl group and X is one of: F, Cl, Br, $NO_2$, and CN.

In some embodiments, one or more $CH_2$ groups in the $C_1$-$C_{20}$ alkyl group is optionally substituted with at least one substituent selected from one of: O, CO, NH, $NHR^+$, a cyclic alkyl, an optionally substituted aromatic ring containing carbon, an optionally substituted aromatic ring containing carbon and heteroatoms includes at least one of nitrogen, sulfur, and oxygen.

In some embodiments, the triazole-based removable additive is optionally substituted 1,2,4-Triazole and wherein one or more functional groups in the 1,2,4-Triazole are optionally substituted with at least one substituent that is selected based on the solvent.

In some embodiments, the triazole-based removable additive is removed from the ink composition by thermal annealing.

In accordance with some embodiments, a method of preparing an ink composition is provided, the method comprising: reacting a plurality of carbon nanotubes, a triazole-based removable additive, and a solvent, wherein the plurality of carbon nanotubes are dispersed within the solvent and wherein the triazole-based removable additive stabilizes the plurality of carbon nanotubes that are dispersed in the solvent.

In some embodiments, the plurality of carbon nanotubes are single-walled carbon nanotubes.

In some embodiments, the plurality of carbon nanotubes are a mixture of metallic and semiconducting single-walled carbon nanotubes.

In some embodiments, the plurality of carbon nanotubes are enriched in metallic single-walled carbon nanotubes.

In some embodiments, the plurality of carbon nanotubes are metallic single-walled carbon nanotubes.

In some embodiments, the plurality of carbon nanotubes are enriched in semiconducting single-walled carbon nanotubes.

In some embodiments, the plurality of carbon nanotubes are single-walled carbon nanotubes with a specific chirality.

In some embodiments, the solvent is one of: water, N-methylpyrrolidinone (NMP), propylene glycol monomethyl ether acetate (PGMEA), methyl ethyl ketone (MEK), and methyl isopropyl ketone.

In some embodiments, the triazole-based removable additive is a 1,2,4-triazole compound having a chemical formula:

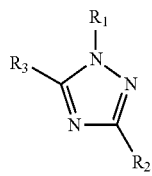

In some embodiments, the triazole-based removable additive is unsubstituted 1,2,4-Triazole. Alternatively, the triazole-based removable additive is substituted 1,2,4-Triazole, wherein one or more substituents are selected based on the solvent.

In some embodiments, each of $R_1$, $R_2$, and $R_3$ in the 1,2,4-triazole compound is hydrogen. In some embodiments, at least one of $R_1$, $R_2$, and $R_3$ in the 1,2,4-triazole compound is hydrogen.

In some embodiments, at least one of $R_1$, $R_2$, and $R_3$ in the 1,2,4-triazole compound is an $C_1$-$C_{20}$ alkyl group. In some embodiments, the $C_1$-$C_{20}$ alkyl group is optionally substituted with at least one substituent selected from one of: OH, OR, $CO_2R$, OOCR, $SO_3H$, X, $SO_2X$, COX, $NH_2$, $NR_2$, $NR_3^+$, optionally substituted benzyl, optionally substituted phenyl, thiophene radicals, $H_2PO_4$, and mixtures thereof, wherein R is the $C_1$-$C_{20}$ alkyl group and X is one of: F, Cl, Br, $NO_2$, and CN. In some embodiments, one or more $CH_2$ groups in the $C_1$-$C_{20}$ alkyl group is optionally substituted with at least one substituent selected from one of: O, CO, NH, $NHR^+$, a cyclic alkyl, an optionally substituted aromatic ring containing carbon, an optionally substituted aromatic ring containing carbon and heteroatoms includes at least one of nitrogen, sulfur, and oxygen.

In some embodiments, the method further comprises providing the plurality of carbon nanotubes in the form of a wet paste to a solution that includes the triazole-based removable additive and the solvent.

In some embodiments, the method further comprises stabilizing the plurality of carbon nanotubes by providing the triazole-based removable additive to a solution that includes the plurality of carbon nanotubes and the solvent.

In some embodiments, the method further comprises stabilizing the plurality of carbon nanotubes by applying the triazole-based removable additive to the plurality of carbon nanotubes prior to dispersing the plurality of carbon nanotubes in the solvent and providing the solvent to the plurality of carbon nanotubes and the triazole-based removable additive.

In some embodiments, the method further comprises applying the ink composition to a substrate and removing a substantial portion of the triazole-based removable additive by thermal annealing, wherein the triazole-based removable additive is removed after applying the ink composition to a substrate. The substrate can be a glass substrate, a plastic substrate, and/or a sapphire substrate.

In some embodiments, the triazole-based removable additive is removed after applying the ink composition to the substrate. For example, a substantial portion of the triazole-based removable additive can be removed after applying the ink composition to the substrate by thermal annealing. The triazole-based removable additive is selected such that the triazole-based removable additive can be removed from the ink composition by at least 90% by thermal annealing at a temperature lower than about 250° C.

In some embodiments, the method further comprises purifying the plurality of carbon nanotubes prior to adding the triazole-based removable additive and the water-based solvent. In some embodiments, the plurality of carbon nanotubes are purified by washing the plurality of carbon nanotubes in a solution of ammonium hydroxide.

In some embodiments, the method further comprises purifying a mixture including the plurality of carbon nanotubes, the triazole-based removable additive, and the water-based solvent by reducing impurities using centrifugation. In some embodiments, the centrifugation reduces amorphous carbon impurities. In some embodiments, a first portion of the centrifuged mixture is stored as the ink composition and a second portion of the centrifuged mixture is discarded.

In some embodiments, the method further comprises passing at least a portion of the centrifuged mixture through a filter to remove particle impurities having a diameter greater than a given size.

In accordance with some embodiments, a method of preparing an ink composition is provided, the method comprising: providing a paste that includes a plurality of single-walled carbon nanotubes; purifying the paste that includes plurality of single-walled carbon nanotubes in a solution of ammonium hydroxide to substantially reduce amorphous carbon impurities; forming a mixture by adding a 1,2,4-triazole compound and a water-based solvent to the purified paste that includes the plurality of single-walled carbon nanotubes, wherein the plurality of single-walled carbon nanotubes are dispersed within the water-based solvent and wherein the 1,2,4-triazole compound stabilizes the plurality of single-walled carbon nanotubes that are dispersed in the water-based solvent; and purifying the mixture by centrifugation, wherein a first portion of the centrifuged mixture is stored as the ink composition and a second portion of the centrifuged mixture is discarded.

In some embodiments, the plurality of carbon nanotubes dispersed within the solvent can be separated between functionalized and unfunctionalized carbon nanotubes (e.g., using density gradient centrifugation or electrophoresis). In addition, in some embodiments, the plurality of carbon nanotubes dispersed within the solvent can be separated between metallic and semiconducting carbon nanotubes (e.g., using chemical or electrophoresis approaches) with or without prior functionalization. For example, in some embodiments, the plurality of carbon nanotubes can be separated such that at least 80% of the plurality of carbon nanotubes are semiconducting single-walled carbon nanotubes. In some embodiments, the carbon nanotube ink described herein can be enriched in either semiconducting or metallic single-walled carbon nanotubes in comparison to their initial abundance in the as-produced material (e.g., often approximately a 2:1 ratio of semiconducting vs. metallic corresponding to the ensemble of all theoretically existing chiralities).

The details of one or more embodiments of the subject matter described herein are set forth in the accompanying drawings and the description below. Other features and advantages of the subject matter described herein will be apparent from the description and drawings, and from the claims.

DETAILED DESCRIPTION

Analysis of as Produced Carbon Nanotubes

Carbon nanotubes such as those produced using the disclosed subject matter can be analyzed and characterized using, among other possible options, Raman spectroscopy and/or thermogravimetric analysis (TGA).

Resonance Raman spectroscopy provides a fast and selective method for the identification and first characterization of SWCNTs. Major identifiable absorption features include the radial breathing mode (RBM), the tangential mode (G-band), and the disorder-induced band (D-band). RBM, which usually appears between $120 \text{ cm}^{-1} < \omega^{RBM} < 270 \text{ cm}^{-1}$, generally corresponds to the atomic vibration of the carbon atoms in the radial direction. Direct correlations with SWCNT diameters have been generally established. The tangential mode or G-band, a characteristic multi-peak feature typically occurring around $1580 \text{ cm}^{-1}$, corresponds to atomic displacements along the tube axis as well as the circumferential direction. Simultaneous observation of RBM and G-band provides strong evidence for the presence of SWCNT. The D-band, occurring around 1350 cm$^{-1}$, reflects the presence of impurities or other symmetry-breaking defects, such as amorphous carbon.

For the example described below, material synthesized and collected under well defined conditions was investigated with a Dimension-P2 Raman system (Lambda Solutions, Waltham, Mass.) using an exciting wavelength of 784.87 nm and approximately 10 mW power. A laser beam with a diameter of about 200 micrometers was directed without microscope to the samples from a distance of about 1 cm. Generally, a 5 second exposure time and integration over 5 spectra were applied. Peak heights of the RBM and G-bands were optimized by fine-tuning the distance between the laser probe and the samples. Samples with strong RBM and weak D-bands as well as high G- to D-band ratios have been considered as being at or close to the optimized conditions and submitted to further analysis, such as scanning electron microscopy (SEM) and TGA, the latter allowing for a quantitative assessment of SWCNT abundance in given samples.

Figure 1:
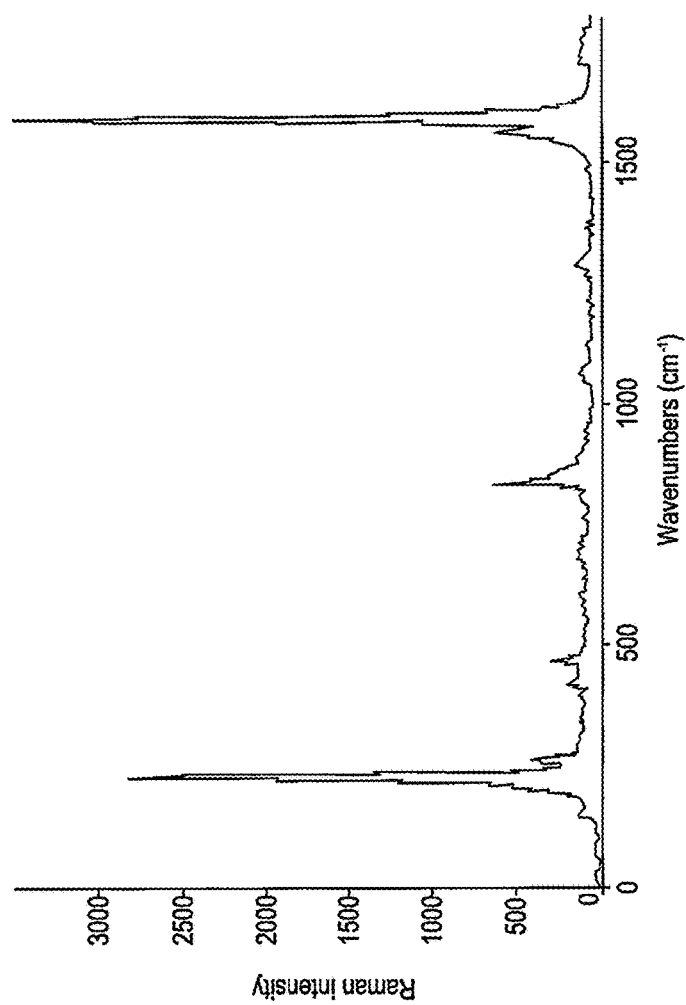
FIG. 1 is a chart showing a Raman spectrum of as produced carbon nanotube material in accordance with some embodiments of the present invention.

As shown in the Raman spectrum of FIG. 1, the D-band was found to be barely detectable while RBM peaks at 229.6 cm$^{-1}$ and 265.5 cm$^{-1}$ were identified. Using the relationship $\omega^{RBM}=234/d_t+10$ cm$^{-1}$, as suggested by Milnera et al., "Periodic Resonance Excitation and Intertube Interaction from Quasicontinuous Distributed Helicities in Single-Wall Carbon Nanotubes," Phys. Rev. Lett. 84, 1324-1327 (2000), for bundles of SWCNT, these peaks correspond to diameters of about 1.07 and about 0.92 nm, respectively. However, due to the strong dependence of Raman intensities on the resonance energies of the SWCNT present, such a diameter distribution generally reflects only SWCNT resonating at 784.87 nm and may not be representative for the investigated sample. For example, a Raman spectrum of similar material measured at 647 nm gives a significantly different picture: RBM peaks corresponding to 1.30, 0.98 and 0.87 nm have also been identified.

It should be noted that, as shown in FIG. 1, the shape of the G-band occurring in the 1500-1605 cm$^{-1}$ range corresponds to tangential vibrations indicating the presence of both conducting SWCNTs and semi-conducting SWCNTs. It should further be noted that, as also shown in FIG. 1, the weakness of the peak near 1350 cm$^{-1}$ indicates that an insignificant low level of impurities or other symmetry-breaking defects is present.

Figure 2:
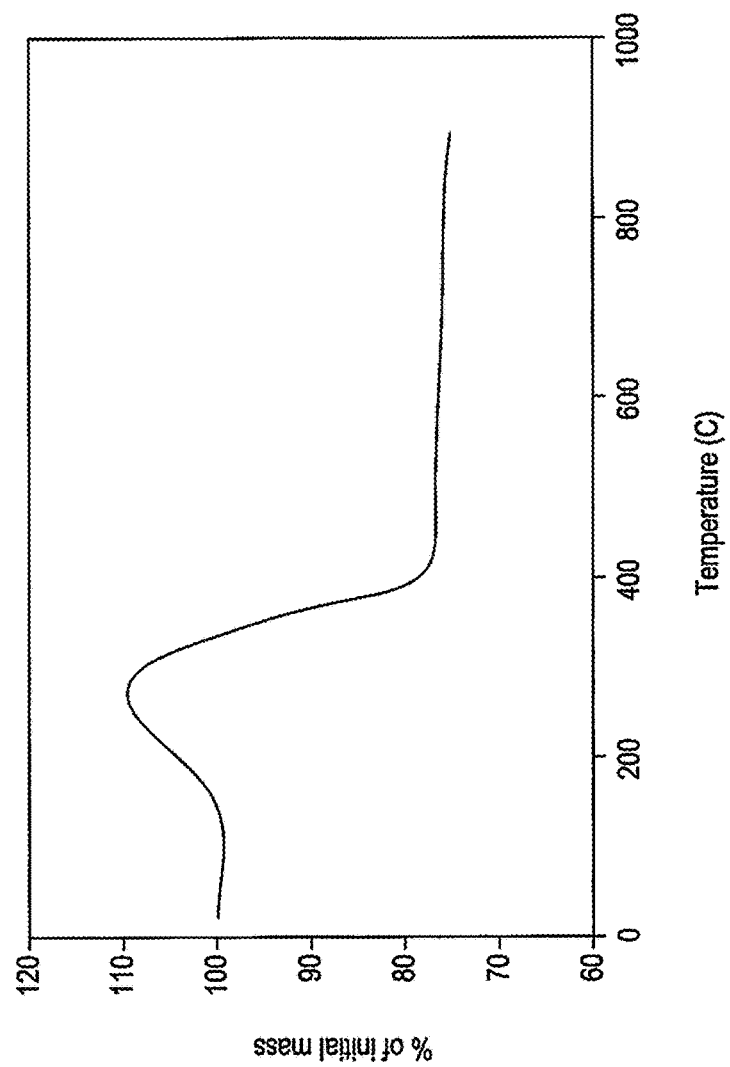
FIG. 2 is a chart showing an example of a thermogravimetric analysis of a raw carbon nanotube material containing about 50% of a catalyst metal impurity that takes into account the oxidation of initially present iron to iron oxide in accordance with some embodiments of the present invention.
Figure 3:
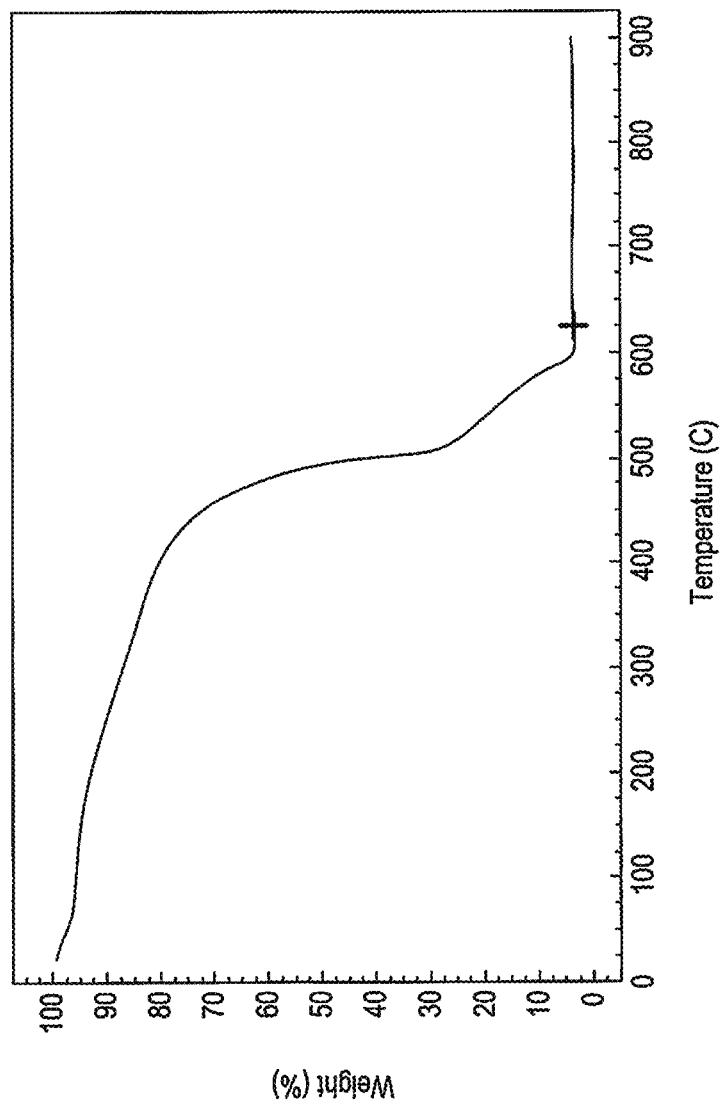
FIG. 3 is chart showing an example of a thermogravimetric analysis of a purified carbon nanotube material in accordance with some embodiments of the present invention.

The purity of bulk SWCNT samples can be determined using thermogravimetric analysis (TGA) under air, for example, using a TGA i 1000 instrument (available from Instrument Specialists, Twin Lakes, Wis.). Heating rates of, for example, 5 or 7.5 K/min from room temperature to 900° C. were applied. A typical TGA plot of raw, unpurified SWCNT is shown in FIG. 2. FIG. 2 is a chart showing an example of a thermogravimetric analysis of a raw carbon nanotube material containing about 50% of a catalyst metal impurity in accordance with some embodiments of the present invention. This chart takes into account the oxidation of initially present iron to iron oxide. FIG. 3 is a chart showing an example of a thermogravimetric analysis of a purified carbon nanotube material in accordance with some embodiments of the present invention.

Analysis of multiple batches produced at identical process conditions using the disclosed subject matter led to very similar, nearly overlapping TGA plots, indicating a high degree of reproducibility of purity assessment. Quantification of the composition of a carbonaceous material requires the knowledge of the composition of the metal phase in the initial sample in order to account for increase of mass by oxidation of elemental iron.

Quantitative characterization of the metal phase can be conducted using wide-angle X-Ray Diffraction (XRD) (e.g., using a Rigaku RU300 X-ray generator). Silicon (Si) can be added as an internal standard and XRD patterns measured. Both maghemite (Fe$_2$O$_3$) and elemental iron (Fe) can be identified in the as-produced material, whereas only some elemental iron (Fe) is typically found to remain in SWCNT that are purified according to the disclosed subject matter. Using an internal standard, analysis of XRD spectra allows for the quantitative determination of Fe-to-Fe$_2$O$_3$ weight ratios. Assuming complete oxidation of elemental iron to Fe$_2$O$_3$ during the TGA run, weight fractions for Fe, Fe$_2$O$_3$, and carbonaceous material were determined. The trace metal contents of the purified CNT material were analyzed by TGA employing the same procedures described above.

General Description of Ink Formation: Water-Based Ink

Figure 4:
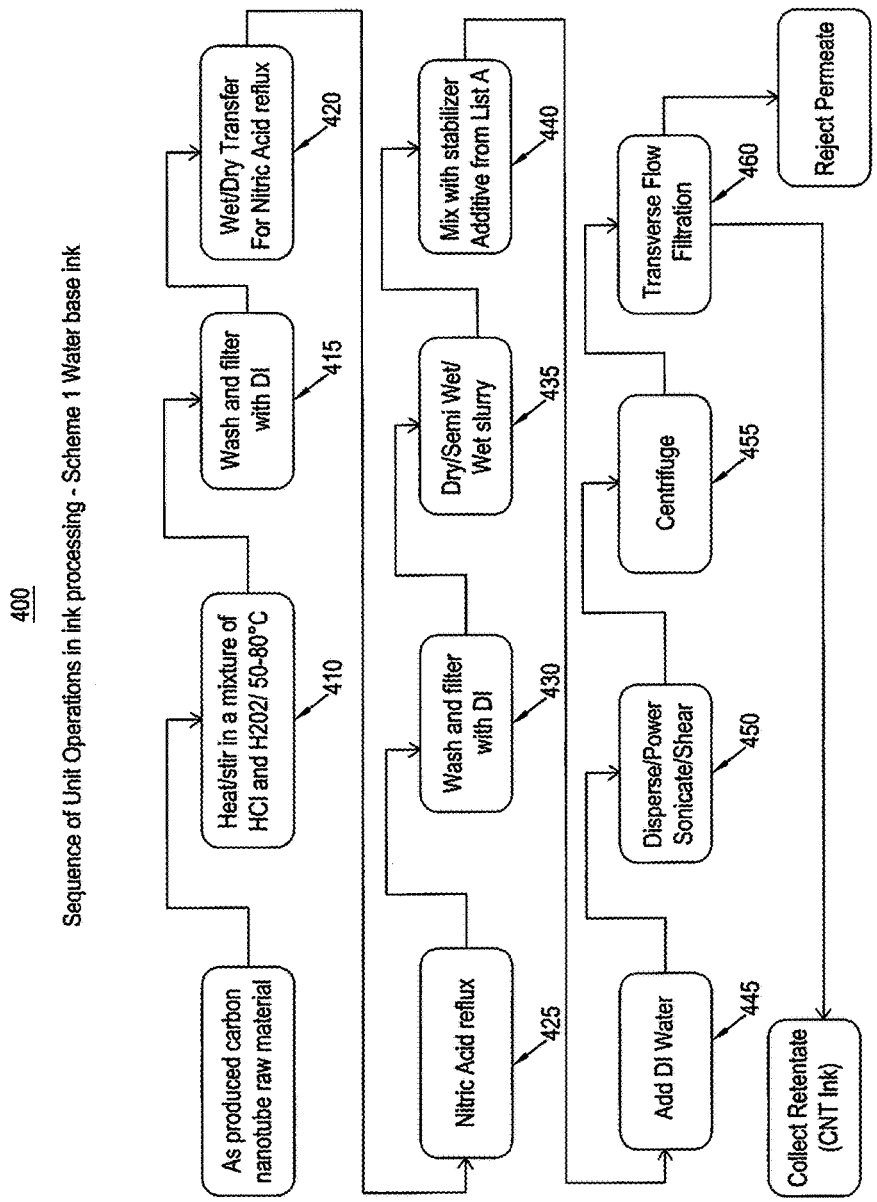
FIG. 4 is a process flow chart showing a method for preparing aqueous-based carbon nanotube inks in accordance with some embodiments of the present invention.

FIG. 4 is a process flow chart showing a method 400 for preparing aqueous-based carbon nanotube inks in accordance with some embodiments of the present invention. The detailed flow chart shows the sequence of unit operations in the processing of a water-based carbon nanotube ink formulation. It should be noted that, in the process flow chart of FIG. 4 and other process flow charts described herein, some steps can be added, some steps may be omitted, the order of the steps may be re-arranged, and/or some steps may be performed simultaneously.

As shown, as produced carbon nanotube raw material is heated on a stir-hot plate in a mixture of hydrochloric acid (HCl) and hydrogen peroxide (H$_2$O$_2$) at 410. The concentration of hydrochloric acid can generally be between about 0.5N to about 10N and the concentration of hydrogen peroxide can generally be between about 5% to about 30%. The ratio of HCl to H$_2$O$_2$ can be kept between about 3:1 to about 1:1. It should also be noted that the temperature at which stirring takes place can generally be between about 50° C. to about 80° C.

It should be noted that as produced carbon nanotube raw material, purified carbon nanotube materials, fullerenes, and/or any other fullerenic materials can be synthesized and/or processed by the approaches described, for example, in Howard et al., U.S. Pat. No. 5,273,729, filed May 24, 1991, Howard et al., U.S. Pat. No. 5,985,232, filed Sep. 11, 1996, Height et al., U.S. Pat. No. 7,335,344, filed Mar. 14, 2003, Kronholm et al. U.S. Pat. No. 7,435,403, filed Jul. 3, 2003, and Howard et al., U.S. Pat. No. 7,396,520, filed Jan. 21, 2005, which are hereby incorporated by reference herein in their entireties.

It should also be noted that the carbon nanotubes in these carbon nanotube-based inks can be synthesized such that any suitable percentage of a particular type of carbon nanotube is included in the carbon nanotube-based ink. For example, in some embodiments, at least 90% of the plurality of carbon nanotubes are single-walled carbon nanotubes. In other embodiments, at least 90% of the plurality of carbon nanotubes are double-walled carbon nanotubes. Alternatively, at least 90% of the plurality of carbon nanotubes are multi-walled carbon nanotubes.

In one embodiment, the hydrogen peroxide can be slowly added to the carbon nanotube acid mixture by, for example, using a syringe pump. Alternatively, the hydrogen peroxide needed for the reaction can be generated in in-situ reactions.

The duration of the stirring/heating can range from about 1 hour to about 48 hours. The CNT/acid/peroxide mixture on heating/stirring can be washed with deionized (DI) water repeatedly in a filtration funnel or Nutsche-type filter for large scale operations (see, e.g., 415-430 of FIG. 4). The CNT-acid slurry is washed until it is neutral to pH paper and colorless.

The $HCl/H_2O_2$ slurry after repeated washings can be completely dried (e.g., less than 1 wt % of water), partially dried (e.g., less than 50 wt % of water), or wet (e.g., the weight of CNT is less than the weight of water) at 435. Accordingly, the $HCl/H_2O_2$ slurry can be used in the form of a powder, partially dried paste, or a wet paste in downstream applications.

In some embodiments, the CNT powder or pastes as described above can be mixed with a non-ionic additive acting as a stabilizing agent at 440, such as diethylenetriamine (DETA), diisopropylethylamine (DIPEA or Hunig's base), or triethanolamine. Other possible amines that can be used are, for example, ethylene diamine, aminoethyl ethanolamine, triethylene tetramine (TETA), tetraethylene pentamine (TEPA), and pentaethylene hexamine (PEHA). It should be noted that small molecular additives can be used as stabilizing agents that disperse single-walled carbon nanotubes without the elimination of the inter-band optical transitions.

In some embodiments, the CNT powder or pastes can also be mixed with composition of amines consisting one or more of the following amines: diethylenetriamine (DETA), diisopropylamine (DIPEA or Hunig's base), triethanolamine, ethylene diamine, aminoethyl ethanolamine, triethylene tetramine (TETA), tetraethylene pentamine (TEPA), and/or pentaethylene hexamine (PEHA) in different proportions.

Alternatively, the CNT powder or pastes can also be mixed with triazole-based additives, such as 1,2,4-Triazole. For example, as-produced single-walled carbon nanotubes can be mixed with water and hydrochloric acid, where the concentration of the hydrochloric acid can be about 37%. The mixture can be stirred, filtered, and rinsed, where water and nitric acid can be added to the rinsed mixture. The mixture can then be heated and stirred, where the mixture can be filtered (e.g., vacuum filtered through filter paper via a Hirsch funnel) after cooling. The purified single-walled carbon nanotubes can be rinsed with deionized water until pH neutral to pH paper. The purified single-walled carbon nanotubes in the form of a wet paste can be added to a solution of 1,2,4-Triazole in deionized water.

It should be noted that, in some embodiments, the triazole-based additive can be unsubstituted 1,2,4-Triazole. For example, as shown in the chemical formula below, each of $R_1$, $R_2$, and $R_3$ can be hydrogen.

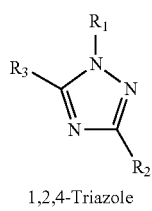

1,2,4-Triazole

Alternatively, in some embodiments, the triazole-based additive can be substituted 1,2,4-Triazole. It should be noted that substituted 1,2,4-Triazole can be used as an additive in water-based solvents and also in non-aqueous solvents based on the selected substituents. That is, $R_1$, $R_2$, and $R_3$ can be selected in order to achieve greater solubility in targeted or selected solvents.

For example, two or three substituting groups can be identical. In a more particular example, two or three substituting groups can be identical and one or two groups can be hydrogen (—H). In yet another example, $R_1$, $R_2$, and $R_3$ (sometimes referred to herein as "R") can be straight-chain or branched or cyclic alkyl chains ($C_1$ to $C_{20}$) which can be unsubstituted, monosubstituted, or polysubstituted. Substituents can be selected from at least one of the following: OH, OR, $CO_2R$, OOCR, $SO_3H$, X (where X is F, Cl, Br, $NO_2$ and/or CN), $SO_2X$, COX, $NH_2$, $NR_2$, $NR_3^+$, substituted or unsubstituted benzyl ($CH_2C_6H_5$), substituted or unsubstituted phenyl, thiophene-radicals, $H_2PO_4$, and mixtures thereof. It should be noted that, in some embodiments, one or more $CH_2$ groups (including the one adjacent to triazole and establishing the link) can be replaced by one of the following units: O, CO, NH, $NHR^+$, $SO_2$, a cyclic alkyl, a substituted or unsubstituted aromatic ring containing only carbon or carbon and heteroatoms, the latter including nitrogen, sulfur, or oxygen.

Any suitable triazole-based additive can be used.

The mixture of CNT powder or pastes with the inclusion of one or more of the above-mentioned additives can then be agitated in deionized water, sonicated in deionized water, power sonicated in deionized water, or dispersed in water using a high-shear mixer at 445 and 450.

The CNT-water-stabilizer suspension or dispersion thus obtained can then be filtered through a coarse filter (e.g., a filter having openings greater than about 10 micrometers) to eliminate larger suspended particles.

At 455, the resulting filtered solution can be centrifuged in an ultracentrifuge that subjects a centrifugal force of greater than about 5,000 g to about 200,000 g. The centrifuge used can be, for example, a static batch rotor type centrifuge, a continuous flow type centrifuge, or a tubular flow type centrifuge. It should also be noted that volumes of CNT dispersions handled in a batch system can be about a few cc to several hundreds of cc. The volumes handled by the flow system can range from about a few cc/minutes to several gallons/hr.

In some embodiments, a portion of the centrifuged mixture or solution can be collected for further processing, while the remaining portion of the centrifuged mixture or solution can be disposed or discarded. For example, upon sonicating and centrifuging the mixture, the top two-thirds of the centrifuged mixture can be collected for additional processing to create a nanotube ink and the remaining one-third of the centrifuged mixture can be disposed.

At 460, the centrifuged solution obtained can be filtered in a tangential flow filtration assembly to remove extraneous carbon nanoparticles that are below a certain cut-off limit. It should be noted that the filtration assembly can handle volumes ranging from about a few cc/minutes to several gallons/hr.

A single-walled carbon nanotube (SWCNT) can be viewed as a rolled-up graphene sheet within certain allowed chiralities. Based on this geometric constraint, SWCNT produced by any method statistically is made up of about one-third with metal-like electrical conduction and about two-thirds showing a semiconducting behavior. Various chemical and electrophoretic methods have demonstrated the separation of the carbon nanotubes by types, falling into the metallic and semiconducting ones.

In some embodiments, carbon nanotubes thus separated into metallic and semiconducting carbon nanotubes at various degrees of separation or enrichment can be made into the formation of carbon nanotube inks employing a combination of steps described herein. For example, in some embodiments, the plurality of carbon nanotubes dispersed in the solvent can be separated such that at least 80% of the plurality of carbon nanotubes are semiconducting single-walled carbon nanotubes. In some embodiments, the plurality of carbon nanotubes can be enriched in either semiconducting or metallic single-walled carbon nanotubes, for example, in comparison to their initial abundance in the as-produced carbon nanotube materials (e.g., often approximately a 2:1 ratio of semiconducting vs. metallic corresponding to the ensemble of all theoretically existing chiralities).

Figure 5:
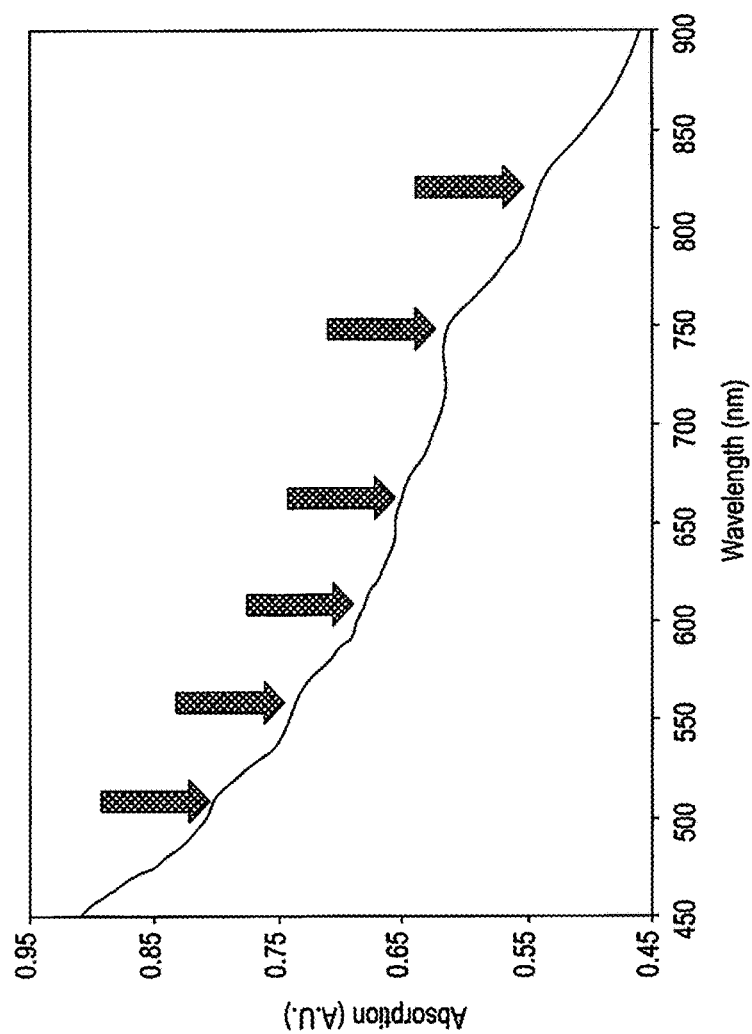
FIG. 5 is a chart showing an ultraviolet-visible absorption spectrum of a carbon nanotube based ink as a final product in a water-based employing DIPEA as the stabilizing agent, where the interband optical transitions indicative of an intact electronic structure of the SWCNT are marked with black arrows, in accordance with some embodiments of the present invention.

FIG. 5 is a chart showing an ultraviolet-visible absorption spectrum of a carbon nanotube-based ink as a final product in a water-based employing DIPEA as the stabilizing agent. The interband optical transitions indicative of an intact electronic structure of the SWCNT are indicated with black arrows.

Figure 6:
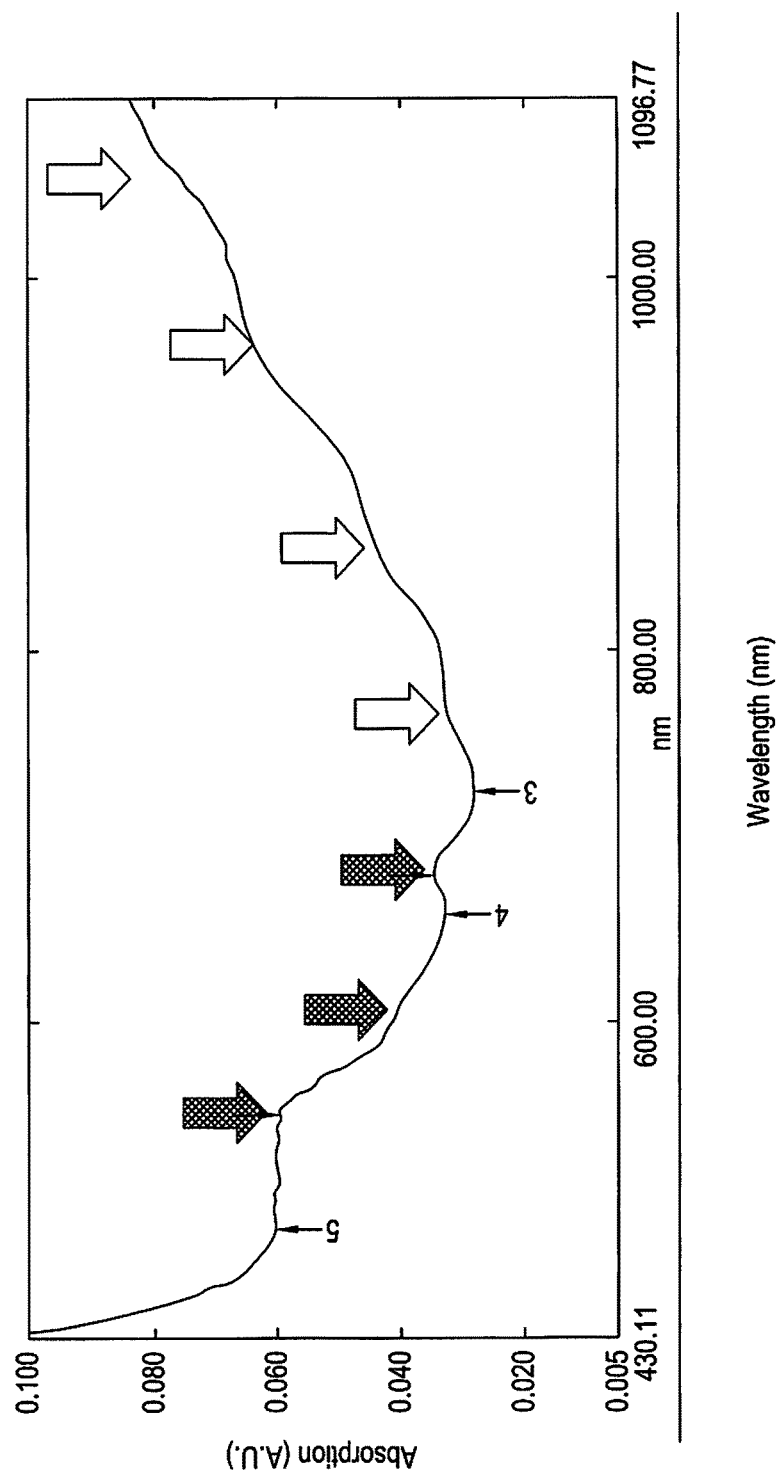
FIG. 6 is a chart showing an ultraviolet-visible absorption spectrum of a carbon nanotube film deposited from the water-based ink on a 6"×4" glass substrate, where the interband optical transitions arising from the first van Hove transitions are shown with white arrows and the second van Hove transitions are shown with black arrows, in accordance with some embodiments of the present invention.

FIG. 6 is a chart showing an ultraviolet-visible absorption spectrum of a carbon nanotube film deposited from the water-based ink on a 6"×4" glass substrate. The interband optical transitions arising from the first van Hove transitions are indicated with white arrows and the second van Hove transitions are indicated with black arrows.

Figure 7:
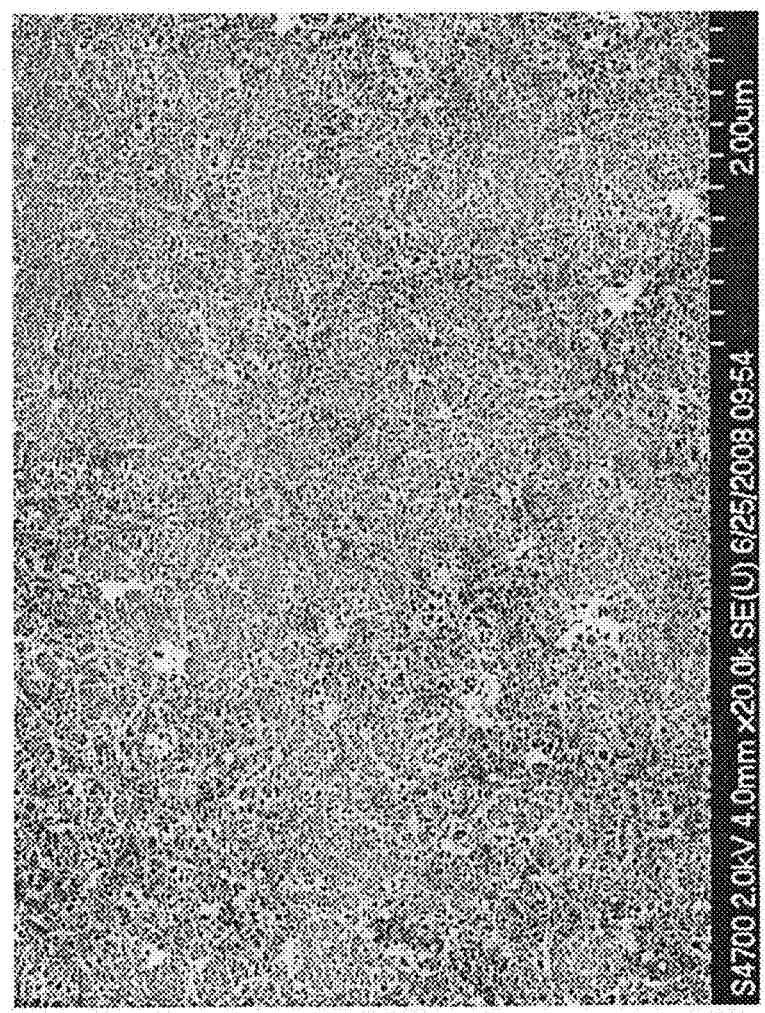
FIG. 7 is a scanning electron microscope (SEM) image of a dense carbon nanotube network deposited on a sapphire substrate in accordance with some embodiments of the present invention.

FIG. 7 is a scanning electron microscope (SEM) image of a dense carbon nanotube network deposited on a sapphire substrate in accordance with some embodiments of the present invention.

General Description of Ink Formation: Solvent-Based Ink

Figure 8:
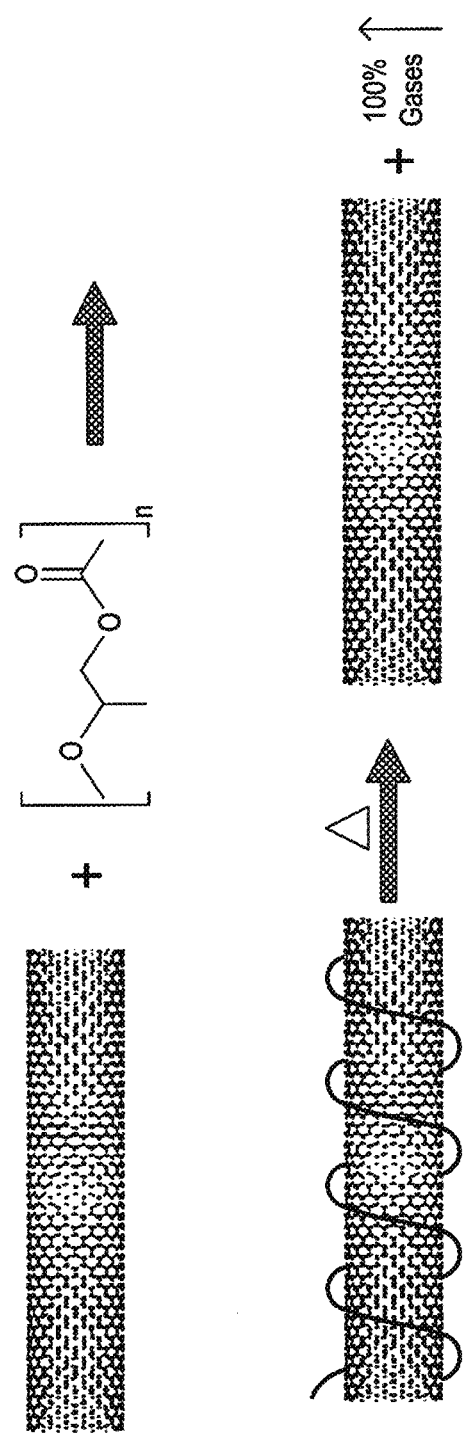
FIG. 8 is an exemplary schematic diagram showing the decomposable polypropylene carbonate molecules wrap around the carbon nanotubes to suspend them in the organic solvent in accordance with some embodiments of the present invention.

FIG. 8 is an exemplary schematic diagram showing the mechanisms for creating a solvent-based ink. In some embodiments, the decomposable polypropylene carbonate molecules wrap around the carbon nanotubes, as shown in FIG. 8, to help them stabilize in the chosen organic solvent. Alternatively, the polymer molecules may co-dissolve and function as viscosity adjustment agents, thereby aiding to control the rheological properties of the CNT-solvent ink. In either embodiment, a CNT film that is deposited on a solid substrate will still have the polymer molecules. The polymer molecules decompose on thermal annealing in air into 100% non-toxic gaseous products. In addition, more than about 90% of the polymer loss occurs below 200° C. at which temperature carbon nanotubes are very stable even in air. The resulting final product is a neat carbon nanotube film.

Figure 9:
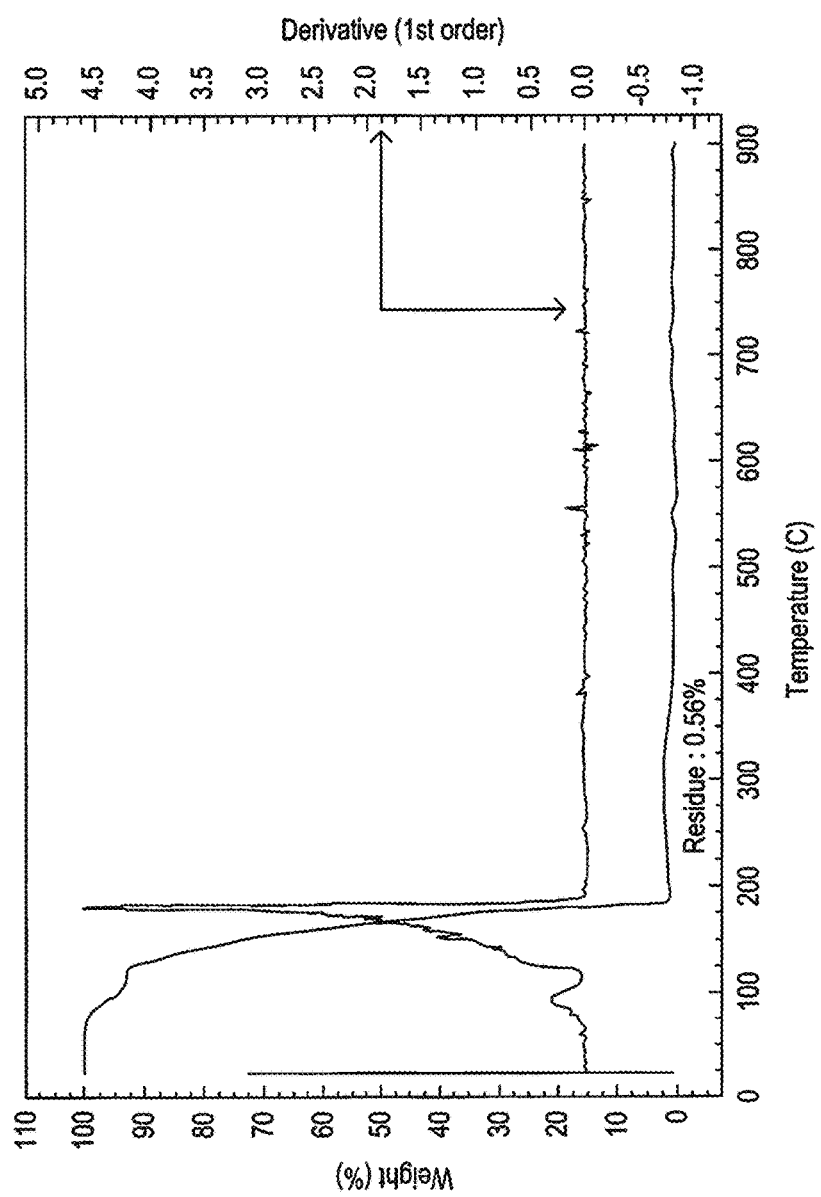
FIG. 9 shows a thermogravimetric analysis (TGA) plot and its first derivative of polypropylene carbonate (PPC) showing the sharp decomposition of the polymer in accordance with some embodiments of the present invention.

For example, FIG. 9 is a chart showing a thermogravimetric analysis (TGA) plot of polypropylene carbonate (PPC) and the sharp decomposition of the polymer. As shown, more than 95% of the polymer loss occurs below 200° C. at which temperature carbon nanotubes are very stable even in air. The derivative plot shows the sharp and rapid decomposition. It should be noted that approximately 0.5 wt % residue shown in FIG. 9 arises from extraneous impurities.

Figure 10:
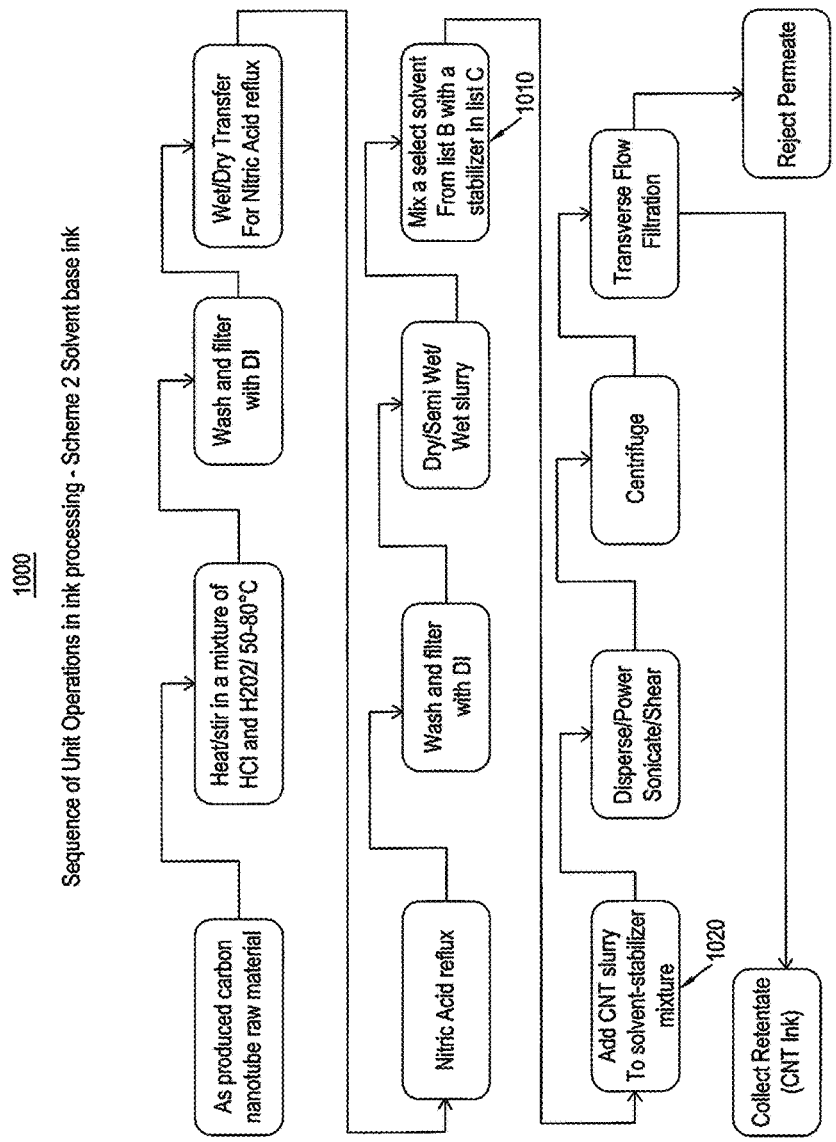
FIG. 10 is a process flow chart showing a method for preparing solvent-based carbon nanotube inks in accordance with some embodiments of the present invention.

Referring to FIG. 10, FIG. 10 is a process flow chart showing one of the methods 1000 for preparing solvent-based carbon nanotube inks in accordance with some embodiments of the present invention. The detailed flow chart shows the sequence of unit operations in the processing of a solvent-based carbon nanotube ink formulation. It should be noted that, in the process flow chart of FIG. 10 and other process flow charts described herein, some steps can be added, some steps may be omitted, the order of the steps may be re-arranged, and/or some steps may be performed simultaneously.

Similar to FIG. 4, method 1000 begins with heating as produced carbon nanotube raw material on a stir-hot plate in a mixture of hydrochloric acid (HCl) and hydrogen peroxide ($H_2O_2$). The concentration of hydrochloric acid can generally be between about 0.5N to about 10N and the concentration of hydrogen peroxide can generally be between about 5% to about 30%. The ratio of HCl to $H_2O_2$ can be kept between about 3:1 to about 1:1. It should also be noted that the temperature at which stirring takes place can generally be between about 50° C. to about 80° C.

As described above, in one embodiment, the hydrogen peroxide can be slowly added to the carbon nanotube acid mixture by, for example, using a syringe pump. Alternatively, the hydrogen peroxide needed for the reaction can be generated in in-situ reactions.

The duration of the stirring/heating can range from about 1 hour to about 48 hours. The CNT/acid/peroxide mixture on heating/stirring can be washed with deionized (DI) water repeatedly in a filtration funnel or Nutsche-type filter for large scale operations (see, e.g., 115-130). The CNT-acid slurry is washed until it is neutral to pH paper and colorless.

The HCl/$H_2O_2$ slurry after repeated washings can be completely dried (e.g., less than 1 wt % of water), partially dried (e.g., less than 50 wt % of water), or wet (e.g., the weight of CNT is less than the weight of water). Accordingly, the HCl/$H_2O_2$ slurry can be used in the form of a powder, partially dried paste, or a wet paste in downstream applications.

As shown in FIG. 10, a solvent mixture is prepared by mixing an organic solvent with a stabilizing additive at 1010. For example, a solvent mixture can be prepared by dissolving an accurately weighed quantity of a stabilizer in the range of about 0.1 to about 5 wt % of polypropylene carbonate in a suitable organic solvent, preferably N-methylpyrrolidinone (NMP).

Other suitable solvents that can also be used may include, for example, propylene glycol monomethyl ether acetate (PGMEA), cyclohexanone, Methyl ethyl ketone (MEK), methyl isopropyl ketone, etc.

It should be noted that polypropylene carbonates of different molecular weights can also be used as a viscosity adjusting agent instead of or in addition to a stabilizing additive in solvents such as N-methylpyrrolidinone (NMP), propylene glycol monomethyl ether acetate (PGMEA), cyclohexanone, Methyl ethyl ketone (MEK), methyl isopropyl ketone, etc.

Referring back to FIG. 10, at 1020, as prepared raw carbon nanotubes, semi-purified carbon nanotubes, purified carbon nanotube powder, or purified carbon nanotube pastes as described above can be mixed with the solvent mixture at a concentration of about 0.1 to about 5 wt % and then agitated, sonicated, power sonicated, or dispersed using a high-shear mixer.

The CNT-polymer-solvent suspension or dispersion can be filtered through a coarse filter (e.g., a filter having openings greater than about 10 micrometers) to eliminate larger suspended particles.

The resulting filtered solutions/dispersions can be centrifuged in an ultracentrifuge that subjects a centrifugal force of greater than about 5,000 g to about 200,000 g. The centrifuge used can be, for example, a static batch rotor type centrifuge, a continuous flow type centrifuge, or a tubular flow type centrifuge. It should also be noted that volumes of CNT dispersions handled in a batch system can be about a few cc to several hundreds of cc. The volumes handled by the flow system can range from about a few cc/minutes to several gallons/hr.

It should be noted that the triazole-based additives used to aid in the dispersion and/or stabilization of the ink can be removed using any suitable approach. Generally speaking, a film can be cast as a standalone film or deposited on a substrate using any suitable coating technique, such as spin coating, spray coating, gravure coating, inkjet printing, etc. A portion of the triazole-based removable additive can be removed in the form of vapor or decomposed vapor by selecting the temperature of deposition, which is generally between about 90° C. and about 120° C. Further, the triazole-based additive can be removed by annealing the deposited film under vacuum, air or nitrogen, using, e.g., suitable commercially available ovens. In the case of annealing under air, the temperature may not exceed about 200° C. In the case of vacuum or nitrogen flow ovens, the temperature can be as high as about 400° C. provided the stability and reactivity of the deposited substrate would allow. This ability to remove the triazole-based additive after film formation provides many advantages in the formation of neat carbon nanotube networks allowing for enhanced performance as transparent, semi-transparent, non-transparent conductors or as part of a thin-film transistor.

EXAMPLES

The following examples further illustrate some embodiments of the present invention, but should not be construed as in any way limiting the scope.

Example 1

Raw carbon nanotubes were produced in a combustion method employing methane as the feed stock and iron nanoparticles formed in-situ by the decomposition of iron pentacarbonyl. Approximately 970 mg of raw carbon nanotubes prepared by combustion of methane were added to 200 ml of DI water in a 500 ml round bottom flask. To this mixture, 75 ml of 36% hydrochloric acid was added slowly with stirring followed by the slow addition of 75 ml of ice cold, 30% hydrogen peroxide in drops. This mixture was allowed to stir over a magnetic hot plate stirrer overnight at a temperature of about 60° C. The mixture was then allowed to cool to room temperature without stirring. A black sediment of carbon nanotubes settled at the bottom while the supernatant liquid was deep yellow/brown and transparent due to the presence of iron ions. The supernatant liquid was decanted into a larger flask. About 100 ml of DI water was added to the solid contents, which was hand stirred and allowed to settle over few minutes. The new supernatant liquid turned pale and was decanted as described before. This procedure was repeated until the supernatant liquid was colorless and clear. At this point the decanted liquid was filtered through a 90 mm diameter Whatman filter paper (#50, hardened) in a ceramic Büchner funnel. This first stage wet CNT slurry collected on the filter paper was washed until the washings were no different in pH compared to DI water as tested by a pH paper. A small portion of this wet CNT slurry was dried in the Büchner funnel by drawing air through it by applying vacuum at the flask. The vacuum was applied with a simple rotary pump (10 mm of mercury) until the powder peeled off from the filter paper and was collected in a bottle.

Example 2

A first stage wet CNT slurry prepared as described in Example 1 was transferred back to a clean 500 ml round bottom (RB) flask from the filter paper by washing with approximately 50 ml of DI water. To this slurry, 100 ml of DI water and 50 ml of 6N nitric acid was added. The nitric acid was added dropwise. The flask was fitted with a reflux condenser cooled with running cold water and the mixture in the RB flask was stir heated on a hot plate to reflux. After refluxing for about 3 hours, this mixture was allowed to cool to room temperature without stirring. A black sediment of carbon nanotubes settled at the bottom of the RB flask while the supernatant liquid was very pale yellow. The supernatant liquid was decanted into a larger flask. About 100 ml of DI water was added to the solid contents in the RB flask and was hand stirred before being allowed to settle over few minutes. The supernatant liquid in the RB flask turned colorless and clear and was decanted. The decanted liquid was filtered through a 90 mm diameter Whatman filter paper (#50, hardened) in a ceramic Büchner funnel. The wet carbon nanotube slurry was washed until the washings were no different in pH compared to DI water as tested by a pH paper. This resultant, second stage wet CNT slurry was dried in the Büchner funnel by drawing air through it under vacuum. The vacuum was applied with a simple rotary pump (10 mm of mercury) until the powder peeled off from the filter paper for collection in a bottle. Some of the second stage wet slurry was only partially dried and stored as a purified CNT paste.

Example 3

In yet another purification method, as prepared raw carbon nanotube samples were pre-washed in neutral DI water prior to acid treatment as described below. An accurately weighed amount of raw carbon nanotubes (e.g., less than about one gram) is placed in a thick walled glass tube and sonicated with a power sonicator horn for 15 minutes. The resulting dark suspension was filtered through a cellulose filter (2-5 microns) for the removal of finer particles. The CNT water paste collected over the filter paper was used in the further purification process in the place of as prepared CNT.

Example 4

In yet another acid purification process, approximately one gram of the CNT water paste collected as described in Example 3 was transferred to a 2 liter round bottom flask and DI water was added to make up the volume to 1000 ml. To this mixture, 100 ml of 36% HCl and 50 ml of 30% hydrogen peroxide were added and allowed to stir on a hot plate at room temperature overnight. The CNT acid slurry was washed with DI water as described in Examples 1 and 2. The purified wet CNT slurry was transferred to a 500 ml round bottom flask to which 100 ml of 6N nitric acid and 250 ml of DI water were added. The CNT acid mixture was refluxed for 3 hours and allowed to cool. The nitric acid water slurry was filtered and washed through a filter paper and allowed to dry partially. The partially dried CNT was further used in the preparation of a water-based CNT ink as described herein.

Example 5

In yet another example, about 500 mg of the partially dried CNT paste as described in Example 4 was placed in a ceramic cup to which 2 ml of N,N-diisopropylethylamine (DIPEA) was added and mixed well manually with a ceramic paddle. The mixture was allowed to sit overnight. The CNT-DIPEA paste was transferred to a 1 L conical flask to which 750 ml of DI water was added. The mixture was sonicated for about 1 hour in a Branson bath sonicator and allowed to stand for about an hour. It was resonicated for one more hour and the resulting suspension was centrifuged at 15,000 RPM at 10° C. for 1 hour. The supernatant liquid was collected as a stable, water-based CNT ink.

Example 6

In yet another acid purification process of the raw carbon nanotubes, two grams of the raw carbon nanotubes in a one liter round bottom flask, 500 ml of DI water, 100 ml of 36% HCl and 100 ml of ice cold hydrogen peroxide were added and set for stirring at approximately 60° C. overnight. The CNT acid slurry was washed with DI water as described in Examples 1 and 2. The purified wet CNT slurry was transferred to a 500 ml round bottom flask to which 100 ml of 6N nitric acid and 250 ml of DI water were added. The CNT acid mixture was refluxed for 3 h and allowed to cool. The nitric acid water slurry was filtered through a #50 Whatman filter paper in a Buchner funnel and allowed to dry partially. The partially dried CNT was further used in the preparation of a solvent-based CNT ink as described below in Example 7.

Example 7

A solution of polypropylene carbonate (PPG) (a commercial sample from Novomer Inc.) was prepared by dissolving PPG in 20 ml of N-methylpyrrolidinone (NMP) to a concentration of 2 mg/mL. To this solution, 20 mg of the partially dry CNT prepared as described in Example 6 was added and sonicated in a bath sonicator for 1 hour. The solution in the test tube was transferred to a conical flask. 80 ml of NMP was added to the mixture to make up the total volume to 100 ml. The solution was sonicated 90 minutes and centrifuged at 10,000 RPM for 1 hour at 10° C. A very stable dark solvent-based CNT ink was obtained and bottled.

Example 8

In some embodiments, a triazole-based removable additive can be used in formulating surfactant-free single-walled carbon nanotube inks.

In this example, as-produced single-walled carbon nanotubes were mixed with 250 mL of deionized water and 50 mL of concentrated hydrocholoric acid (HCl) (37%) in a round bottom flask. The flask was then connected to an air cooling condenser/distillation column, and the mixture was allowed to stir at medium speed overnight. The mixture was vacuum filtered through a Whatman 50 filter paper placed in a Hirsch funnel. The filtered single-walled carbon nanotubes were rinsed with deionized water and transferred back into a round bottom flask to which 250 mL of deionized water and 100 mL of 6N nitric acid were added. The flask was then attached to a reflux condenser with circulated chilled water, where the mixture was heated to a boil on a hot plate, stirred at medium speed, and allowed to reflux for about three hours. The mixture was allowed to cool and the contents were vacuum filtered through a Whatman 50 filter paper via a Hirsch funnel. The resulting purified carbon nanotubes were rinsed with deionized water until pH neutral. The purified single-walled carbon nanotubes were collected as a wet paste. The purified single-walled carbon nanotubes can, in some embodiments, be stored in an amber glass vial to protect against direct light illumination.

Example 9

In some embodiments, the purified single-walled carbon nanotubes prepared in Example 8 can be used to prepare a nanotube ink that includes a triazole-based additive.

In this example, a 0.1 wt % solution of 1,2,4-Triazole in deionized water was prepared. A particular amount of purified single-walled carbon nanotubes in the form of a wet paste, prepared as described in Example 8 above, was added to the solution of 1,2,4-Triazole and deionized water to make a solution with 0.1 wt % single-walled carbon nanotubes. This mixture is shear milled for about 15 minutes at 11,000 RPM using a shear mill (e.g., using an IKA Ultra-Turrax T-25 shear mill). The mixture was then sonicated and centrifuged (e.g., at 5000 RPM for about 1 hour) using, for example, a 5210 Branson sonication bath and a Thermo Scientific Jouan C3i Multifunction Centrifuge. In some embodiments, a portion of the centrifuged mixture was collected for further processing, while the remaining portion was discarded. In this example, the top two-thirds of the centrifuged mixture was collected for further processing into a nanotube ink, while the bottom one-third of the centrifuged mixture was disposed. The collected centrifuged mixture was sonicated for about 1 hr in a sonication bath and the mixture was then filtered through a coarse filter to remove remaining clumps or aggregates.

The resulting mixture was then stored as a carbon nanotube ink.

Figure 12:
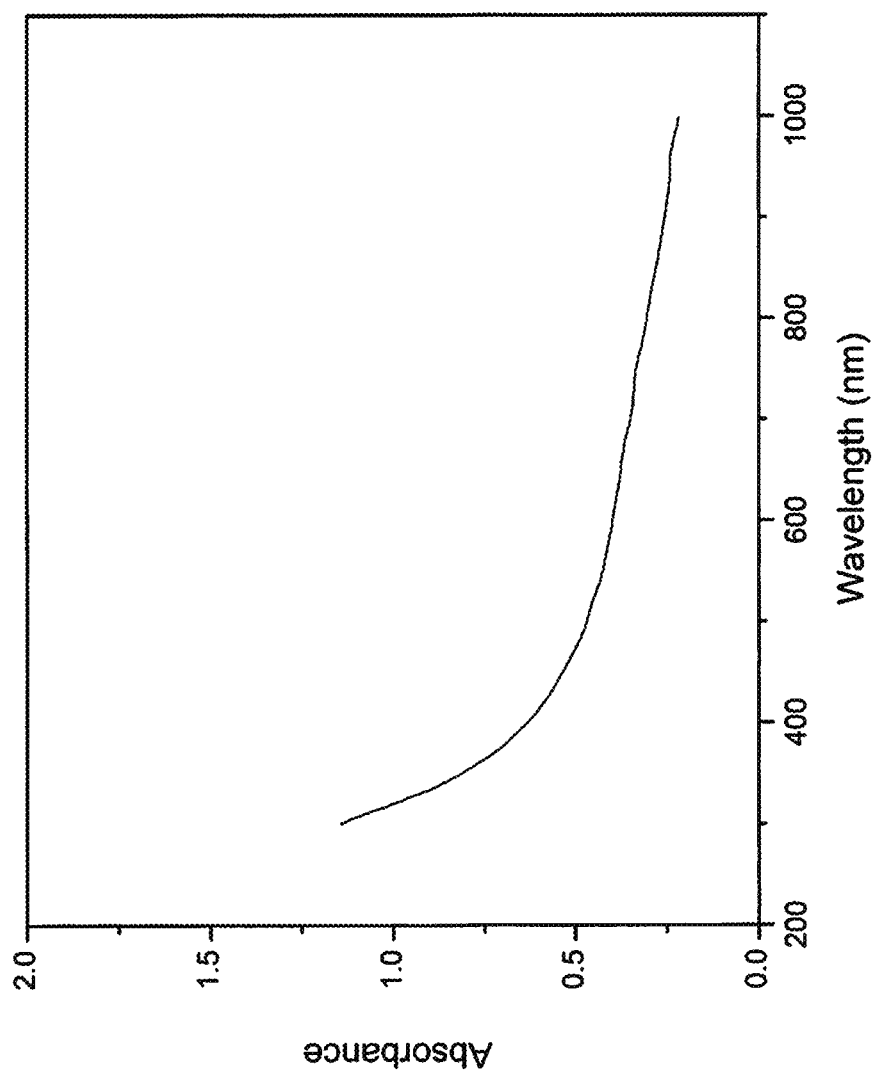
FIG. 12 is a chart showing an ultraviolet-visible-near-infrared (UV-Vis-NIR) absorption spectrum of a single-walled carbon nanotube ink that includes a water-based solvent and a triazole-based removable additive in accordance with some embodiments of the present invention.

FIG. 12 is a chart showing an ultraviolet-visible absorption spectrum of a single-walled carbon nanotube ink prepared in accordance with Example 9 that includes purified single-walled carbon nanotubes prepared in accordance with Example 8 in accordance with some embodiments of the present invention. In the example of FIG. 12, the ultraviolet-visible-near-infrared absorption spectrum of the carbon nanotube ink was measured from 300 nanometers to 1,100 nanometers using a Shimadzu V3101 spectrophotometer to investigate the electronic structure of the single-walled carbon nanotubes in the ink. It should be noted that FIG. 12 confirms the presence of single-walled carbon nanotubes in the nanotube ink.

Example 10

In some embodiments, an optional purification procedure can be performed.

Figure 13:
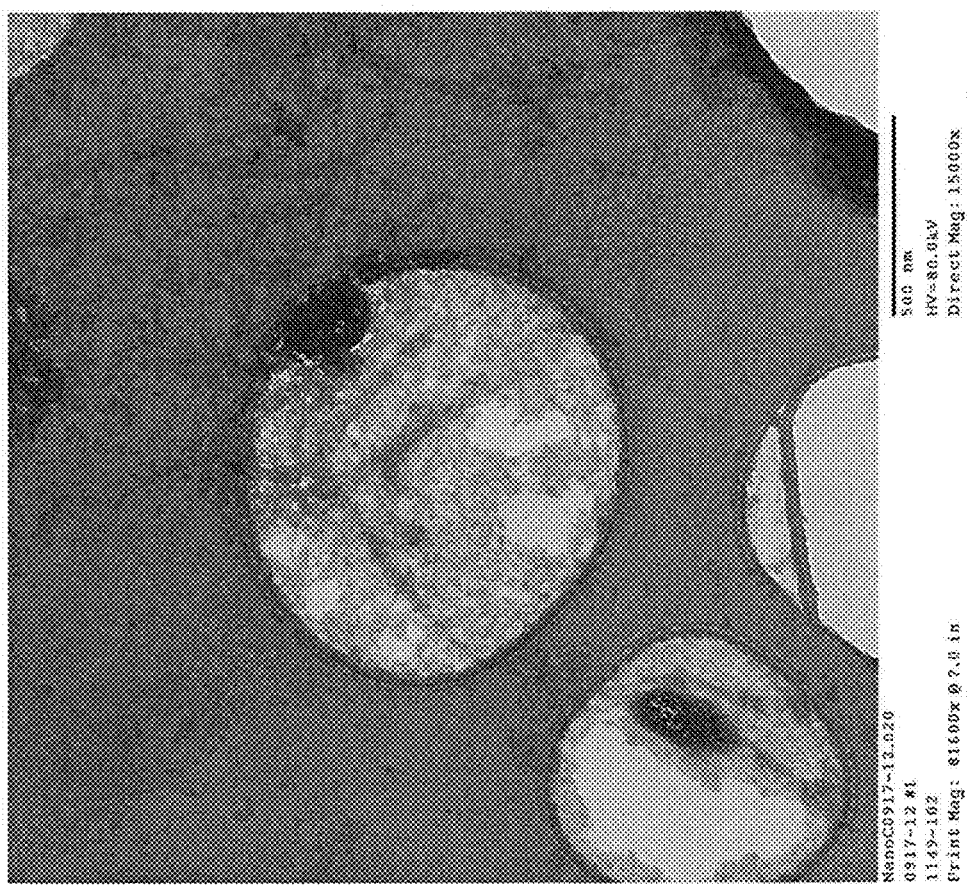
FIG. 13 is a transmission electron micrograph (TEM) image of single-walled carbon nanotubes from FIG. 12 that were purified to remove amorphous carbon impurities in accordance with some embodiments of the present invention.

In this example, a particular amount of purified single-walled carbon nanotubes in the form of a wet paste, prepared as described in Example 8 above, was added to 0.5N ammonium hydroxide ($NH_4OH$) in deionized water. This mixture was sonicated for about 30 minutes followed by vacuum filtration through a Whatman 50 filter paper via a Hirsch funnel. The single-walled carbon nanotubes were then washed with ammonium hydroxide followed by deionized water until pH neutral. The single-walled carbon nanotubes were collected for preparing a nanotube ink. The filtrate was concentrated in a rotary evaporator and the concentrated dispersion was analyzed by spectroscopy and electron microscopy. A transmission electron micrograph (TEM) image of the purified single-walled carbon nanotubes is shown in FIG. 13. More particularly, the TEM image of FIG. 13 shows that the above-mentioned washing procedure removed amorphous, non-tubular carbon impurities.

Example 11

In some embodiments, a water-based nanotube ink can be formed with single-walled carbon nanotubes purified as described using the optional purification procedure of Example 10.

In this example, a 0.1 wt % 1,2,4-Triazole solution in deionized water was prepared. A particular amount of purified single-walled carbon nanotubes in the form of a wet paste, prepared with the purification procedure as described in Example 9 above, was added to make a solution with 0.1 wt % single-walled carbon nanotubes. This mixture was shear milled for about 15 minutes at 11,000 RPM using a shear mill (e.g., using an IKA Ultra-Turrax T-25 shear mill). The mixture was then sonicated and centrifuged (e.g., at 5000 RPM for about 1 hour) using, for example, a 5210 Branson sonication bath and a Thermo Scientific Jouan C3i Multifunction Centrifuge. In some embodiments, the top two-thirds of the centrifuged mixture was collected for further processing, while the bottom one-third of the centrifuged mixture was disposed. The collected centrifuged mixture was sonicated for about 1 hr in a sonication bath and the mixture was then filtered through a coarse filter to remove remaining clumps or aggregates.

The resulting dispersion was then stored as a carbon nanotube ink.

Figure 14:
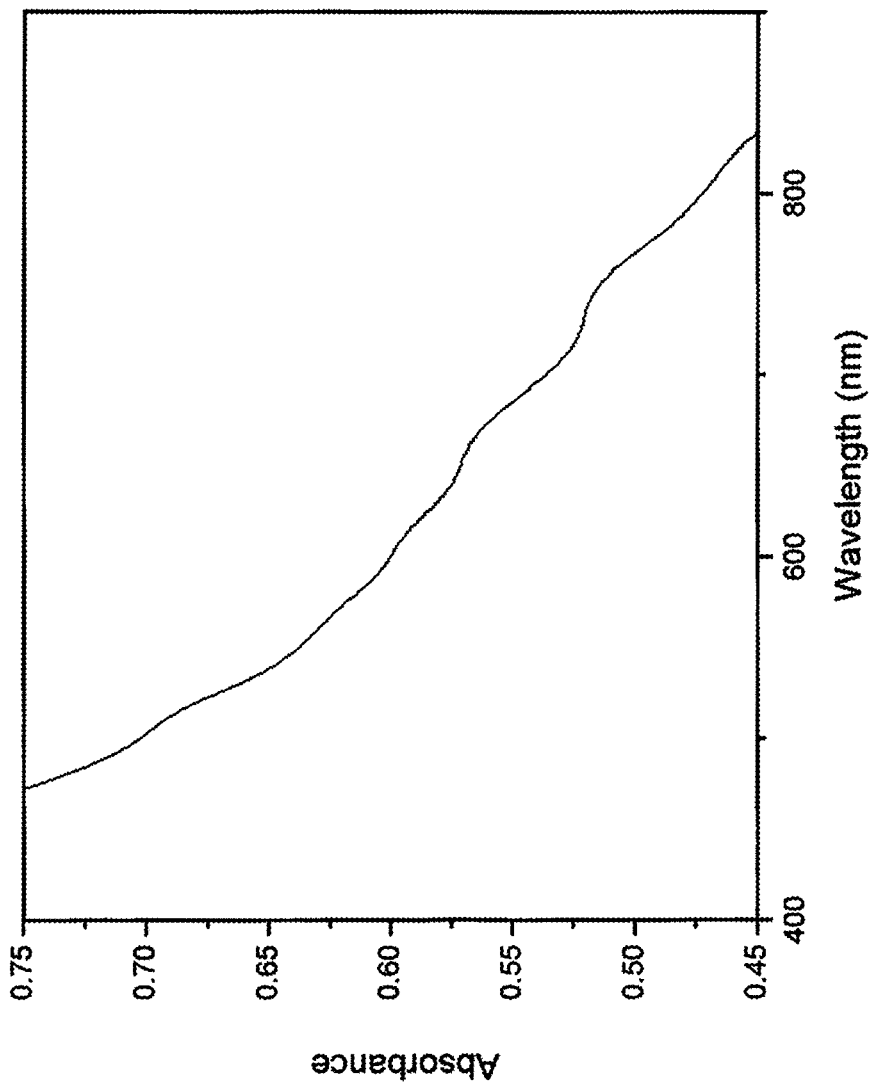
FIG. 14 is a chart showing an ultraviolet-visible-near-infrared (UV-Vis-NIR) absorption spectrum of a single-walled carbon nanotube ink that includes a water-based solvent and a triazole-based removable additive in accordance with some embodiments of the present invention.

FIG. 14 is a chart showing an ultraviolet-visible-near-infrared absorption spectrum of a single-walled carbon nanotube ink prepared in accordance with Example 11 that includes purified single-walled carbon nanotubes prepared in accordance with Example 10 in accordance with some embodiments of the present invention. In the example of FIG. 14, the ultraviolet-visible-near-infrared absorption spectrum of the carbon nanotube ink was measured from 300 nanometers to 1,100 nanometers using a Shimadzu V3101 spectrophotometer to investigate the electronic structure of the SWCNT in the ink. As shown, the optical absorptions arising from the interband electronic transitions in the single-walled carbon nanotubes are clearly present when amorphous carbon impurities are removed or reduced using the purification procedure.

Applications

The resulting ink composition can be coated on any suitable substrate (e.g., a glass substrate, a plastic substrate, a sapphire substrate, etc.) using a number of techniques, including inkjet printing, spin coating, spray coating, etc. In addition, the resulting ink composition can be used in numerous applications ranging from liquid crystal displays (LCDs), antistatic coatings, electrodes, touchscreens, and numerous other applications.

For example, in one embodiment, an ink with extensive bundling of SWCNT and, thus, limited suspendability can be used for applications, such as battery electrodes or capacitors. In another embodiment, an ink with individually suspended SWCNTs can be used for applications, such as transparent conductive coatings.

Figure 11:
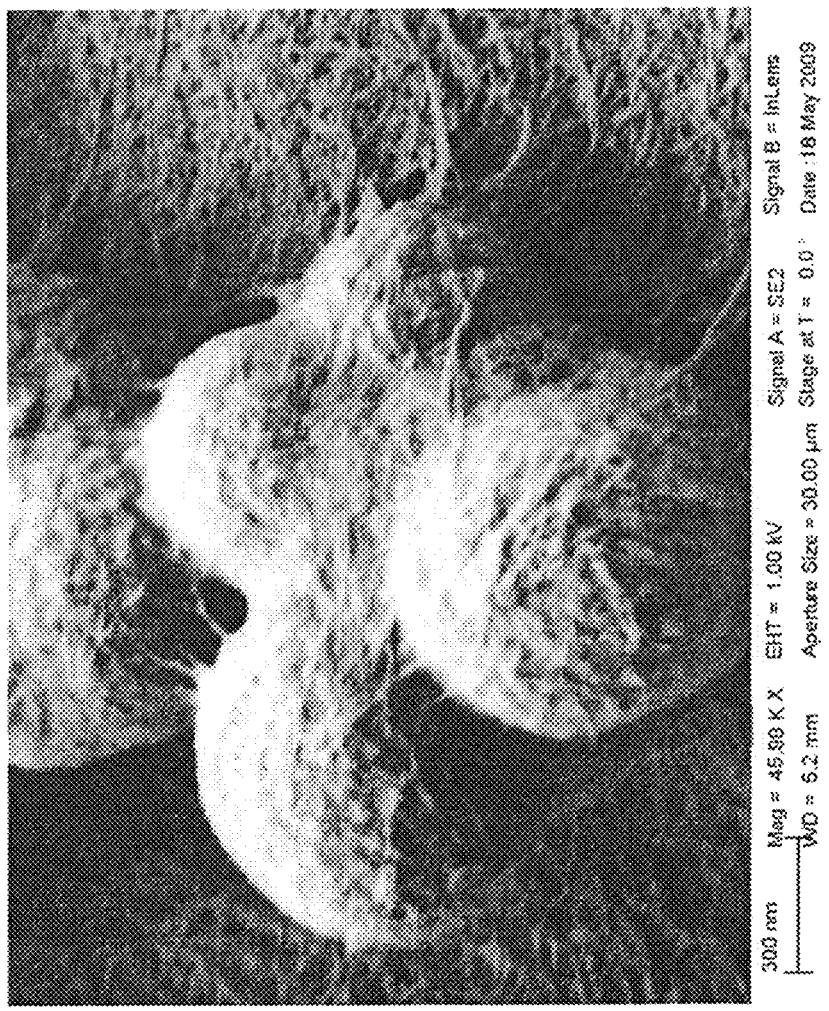
FIG. 11 is a scanning electron micrograph (SEM) image of plastic beads coated with carbon nanotubes in accordance with some embodiments of the present invention.

In another suitable embodiment, an ink prepared as described herein can be coated onto plastic beads ranging in size from about 10 nanometers to several hundred micrometers (μm). Alternatively or additionally, the ink can be coated onto plastic fibers, glass fibers, or ceramic fibers having diameters ranging from 10 nanometers to several hundred micrometers (μm) and having aspect ratios ranging from 10 to $10^6$. In a more particular example, a scanning electronic microscope (SEM) image of plastic beads coated with carbon nanotubes using the above-described ink is shown in FIG. 11.

It should be noted that the coating of plastic, glass, ceramic, and/or other suitable substrates and materials can be used to enhance electric and/or thermal conductivity. Accordingly, this can be used for electrically conducting films or electrostatic dissipation applications.

It should further be noted that the inks prepared as described herein can be used as a medium for chemical functionalization of carbon nanotubes with, for example, but not limited to, reactions with diazonium salts, Diels-Alder reagents, cycloadditions, halogenations, nucleophilic or radical additions (see, e.g., Tasis et al., Chem. Rev. 2006, 106, 1105-1136; and Zhang et al., J. Am. Chem. Soc. 2009, 131, 8446-8454). Such functionalization may selectively occur with metallic or semi-conducting carbon nanotubes.

Mixtures between functionalized and unfunctionalized carbon nanotubes dispersed in the above-mentioned inks can be separated by density gradient centrifugation or electrophoresis.

Carbon nanotubes that are functionalized in other reaction media, such as organic solvents (e.g., o-dichlorobenzene, tetrahydrofuran (THF), etc.) or water in the presence or not of ionic surfactants, are redissolved in the above-mentioned inks.

Accordingly, solvent-based and water-based carbon nanotube inks with removable additives are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. An ink composition comprising:
   a plurality of carbon nanotubes;
   a solvent; and
   a triazole-based removable additive that stabilizes the plurality of carbon nanotubes in the solvent, wherein the triazole-based removable additive is a 1,2,4-triazole compound having a chemical formula:

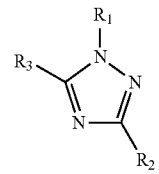

wherein at least one of $R_1$, $R_2$, and $R_3$ is an optionally substituted $C_1$-$C_{20}$ alkyl group.

2. The ink composition of claim 1 wherein the plurality of carbon nanotubes comprise one or more of: single-walled carbon nanotubes, metallic single-walled carbon nanotubes, semiconducting single-walled carbon nanotubes, and mixtures thereof.

3. The ink composition of claim 1, wherein the plurality of carbon nanotubes are enriched in one of: metallic single-walled carbon nanotubes and semiconducting single-walled carbon nanotubes.

4. The ink composition of claim 1, wherein the solvent is one of: water, N-methylpyrrolidinone (NMP), propylene glycol monomethyl ether acetate (PGMEA), methyl ethyl ketone (MEK), and methyl isopropyl ketone.

5. The ink composition of claim 1, wherein the triazole-based removable additive is selected to act as a dispersal agent and a stabilization agent.

6. The ink composition of claim 1, wherein at least one of $R_1$, $R_2$, and $R_3$ is unsubstituted $C_1$-$C_{20}$ alkyl.

7. The ink composition of claim 1, wherein at least one of $R_1$, $R_2$, and $R_3$ is unsubstituted straight-chain $C_1$-$C_{20}$ alkyl.

8. The ink composition of claim 1, wherein at least one of $R_1$, $R_2$, and $R_3$ is unsubstituted branched $C_1$-$C_{20}$ alkyl.

9. The ink composition of claim 1, wherein at least one of $R_1$, $R_2$, and $R_3$ is unsubstituted cyclic $C_1$-$C_{20}$ alkyl.

10. The ink composition of claim 1, wherein the optionally substituted $C_1$-$C_{20}$ alkyl group is substituted with at least one substituent selected from one of: OH, OR, $CO_2R$, OOCR, $SO_3H$, X, $SO_2X$, COX, $NH_2$, $NR_2$, $NR_3^+$, optionally substituted benzyl, optionally substituted phenyl, thiophene radicals, $H_2PO_4$, and mixtures thereof, wherein R is the $C_1$-$C_{20}$ alkyl group and X is one of: F, Cl, Br, $NO_2$, and CN.

11. The ink composition of claim 1, wherein one or more $CH_2$ groups in the $C_1$-$C_{20}$ alkyl group is replaced by one of the following units: O, CO, NH, $NHR^+$, $SO_2$, a cyclic alkyl, an optionally substituted aromatic ring containing carbon, an optionally substituted aromatic ring containing carbon and heteroatoms includes at least one of nitrogen, sulfur, and oxygen.

12. A method of preparing an ink composition according to claim 1, the method comprising:
mixing the plurality of carbon nanotubes, the triazole-based removable additive, and the solvent, wherein the plurality of carbon nanotubes are dispersed within the solvent and wherein the triazole-based removable additive stabilizes the plurality of carbon nanotubes that are dispersed in the solvent.

13. The method of claim 12, wherein the plurality of carbon nanotubes comprise one or more of: single-walled carbon nanotubes, metallic single-walled carbon nanotubes, semiconducting single-walled carbon nanotubes, and mixtures thereof.

14. The method of claim 12, wherein the solvent is one of: water, N-methylpyrrolidinone (NMP), propylene glycol monomethyl ether acetate (PGMEA), methyl ethyl ketone (MEK), and methyl isopropyl ketone.

15. The method of claim 12, further comprising providing the plurality of carbon nanotubes in the form of a wet paste to a solution that includes the triazole-based removable additive and the solvent.

16. The method of claim 12, further comprising:
applying the ink composition to a substrate; and
removing a substantial portion of the triazole-based removable additive by thermal annealing, wherein the triazole-based removable additive is removed after applying the ink composition to a substrate.

17. The method of claim 12, further comprising purifying the plurality of carbon nanotubes prior to adding the triazole-based removable additive and the water-based solvent.

18. A method of preparing an ink composition according to claim 1, the method comprising:
providing a paste that includes a plurality of single-walled carbon nanotubes;
purifying the paste that includes plurality of single-walled carbon nanotubes in a solution of ammonium hydroxide to substantially reduce amorphous carbon impurities;
forming a mixture by adding a 1,2,4-triazole compound and a water-based solvent to the purified paste that includes the plurality of single-walled carbon nanotubes, wherein the plurality of single-walled carbon nanotubes are dispersed within the water-based solvent and wherein the 1,2,4-triazole compound stabilizes the plurality of single-walled carbon nanotubes that are dispersed in the water-based solvent; and
purifying the mixture by centrifugation, wherein a first portion of the centrifuged mixture is stored as the ink composition and a second portion of the centrifuged mixture is discarded wherein the 1,2,4-triazole compound has a chemical formula:

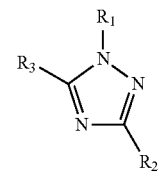

wherein at least one of $R_1$, $R_2$, and $R_3$ is an optionally substituted $C_1$-$C_{10}$ alkyl group.

* * * * *